(12) United States Patent
Currie et al.

(10) Patent No.: US 7,021,808 B2
(45) Date of Patent: Apr. 4, 2006

(54) ILLUMINATED ROPE

(76) Inventors: Robert M. Currie, 325 Bavignon, D.D.O., Quebec (CA) H9B 1Y4; Jonas J. Robertson, 2521 Orbit Ct., Harvey, LA (US) 70058

( * ) Notice: Subject to any disclaimer, the term of this patent is extended or adjusted under 35 U.S.C. 154(b) by 15 days.

(21) Appl. No.: 10/673,194

(22) Filed: Sep. 30, 2003

(65) Prior Publication Data

US 2004/0105278 A1    Jun. 3, 2004

Related U.S. Application Data

(60) Provisional application No. 60/416,826, filed on Oct. 8, 2002.

(51) Int. Cl.
*F21V 9/16* (2006.01)

(52) U.S. Cl. ............ 362/551; 362/554; 362/556; 362/581; 362/576

(58) Field of Classification Search ........... 362/554, 362/556, 560, 581, 576
See application file for complete search history.

(56) References Cited

U.S. PATENT DOCUMENTS 5,995,702 A * 11/1999 Tj.o slashed.nneland ... 385/115
6,450,677 B1 * 9/2002 Knauer et al. ............ 362/551
6,742,909 B1 * 6/2004 Conti et al. ................ 362/84

* cited by examiner

*Primary Examiner*—Sandra O'Shea
*Assistant Examiner*—Anabel Ton
(74) *Attorney, Agent, or Firm*—Merek, Blackmon & Voorhees

(57) ABSTRACT

Numerous embodiments of an illuminated rope include various principles of illuminating translucent objects and wrapping or enclosing the objects with a translucent rope or the like to create attractive illuminated displays. Some embodiments comprise one or more flexible or rigid strands or lengths of radially emitting solid fiberoptic material which is lighted at one or both ends, with a sleeve or wrap of translucent rope or the like surrounding the fiberoptic material. Other embodiments comprise flexible or rigid hollow translucent tubes containing a string of lights therein, with translucent rope material surrounding the hollow illuminated tube. A series of illumination and control modules allows the color output of the devices to be varied as desired, and a series of modular connectors enables two, three, or more of the illuminated ropes to be connected together. Further embodiments comprise hollow, translucent, internally lighted three-dimensional shells or sculptures wrapped with translucent rope.

19 Claims, 15 Drawing Sheets

ILLUMINATED ROPE

REFERENCE TO RELATED PATENT APPLICATION

This application claims the benefit of U.S. Provisional Patent Application 60/416,826 filed on Oct. 8, 2002.

BACKGROUND OF THE INVENTION

1. Field of the Invention

The present invention relates generally to electric lighting and illumination systems, and more particularly to a series of embodiments of illumination devices formed of elongate, flexible or rigid, transparent or translucent light conducting members which are wrapped or enclosed in a translucent rope, cord, or the like. The light conducting members emit light radially therefrom, in turn illuminating the surrounding translucent rope to produce an attractive effect.

2. Description of the Related Art

Lighting configured as elongate strands, has been known since shortly after the development of the incandescent light bulb. One of the earliest applications of such lighting strings was in the form of lighting for Christmas trees, to replace the hazards of lighted candles in such trees. The lights in early lighting strings comprised relatively large incandescent bulbs, which generated a relatively large amount of heat and had relatively short lives. While the lighting was attractive, it formed a series of lighting points along the string, rather than a continuously lighted line.

More recently, miniaturized incandescent bulbs have been developed which produce considerably less heat and have greatly extended life spans in comparison to earlier Christmas tree lighting and the like. Additional lighted strands incorporating a series of incandescent or other light sources have been enclosed in flexible transparent or translucent conduits or tubes, in order to provide protection for the lighting string. However, the effect of such lighting remains the same, i.e., a series of discontinuous points of light disposed along the lighting conductor, whether within a transparent or translucent tube or not. Such lighting can produce very attractive effects for Christmas tree lighting, indoor or outdoor advertising and lighting displays, etc. as desired. Nevertheless, the discontinuous points of light of such lighting strings fail to provide the effect of a continuous line of light, as desired in many circumstances.

Another lighting principle, comprising electrically excited gas filled tubes (e.g., neon), is used to provide continuous lines of electrically powered light. However, neon lighting and related lighting systems and principles, are restricted to relatively rigid glass tubes in order to maintain the relatively low pressure within the tubes which is required for the operation of such lighting. As a result, such lighting cannot be used where it must be bent, flexed, or otherwise configured during its installation or use. Moreover, neon and similar lighting systems cannot be used for structural purposes due to the relatively weak and thin walls of the glass tubes used in their construction.

The present invention provides a series of embodiments of continuously lighted lines, ropes, cables, and/or other elongate devices, which may be lighted by a single light source at one end thereof, or by multiple lights at each end and/or disposed along the length of the line. The present invention incorporates a wrap or sleeve of translucent rope, cord, twine, string, or the like surrounding the lighted tube or sleeve of the system, with the rope, cord, etc. serving to diffuse the light emitted radially from the device and to provide a pleasant lighting effect which appears as an essentially continuously lighted line. The present invention also includes the wrapping of a three-dimensional lighted object with rope, to produce a lighted sculpture or the like.

A discussion of the related art of which the present inventors are aware, and its differences and distinctions from the present invention, are provided below.

U.S. Pat. No. 4,513,692 issued on Apr. 30, 1985 to Alexandra Kinsman et al., titled "Illuminatable Pet Leash," describes a pet leash comprising a translucent tube with a bundle of fiberoptic strands therein. A light source is installed at the handle end of the device, and shines into the fiberoptic bundle to illuminate the tube. Kuhnsman et al. are not clear as to whether the fiberoptics are intended to transmit light radially from the tube, or only to transmit light axially along the tube. In any event, Kuhnsman et al. do not include the wrapping or other installation of a translucent fibrous material surrounding the translucent tube, as a part of their invention.

U.S. Pat. No. 4,529,193 issued on Jul. 16, 1985 to Alexandra Kuhnsman, titled "Illuminatable Jump Rope Device," describes a flexible, translucent device comprising a fiberoptic bundle enclosed within a translucent tube or sleeve. Lighting means are provided at each end of the device, to shine into the central fiberoptic bundle. As in the case of the pet leash device of the '692 U.S. Patent to the same inventor, discussed immediately above, no disclosure is made of any translucent fiber element installed about the translucent sleeve of the device. While Kuhnsman describes the device as being a "jump rope," the device is not actually constructed of rope, nor does it have any rope associated with it. In contrast, the present invention includes an outer covering of rope, cord, or other translucent fiber surrounding the translucent lighted member therein, and diffusing the light emitted radially from the lighted element within the rope or fiber.

U.S. Pat. No. 4,542,446 issued on Sep. 17, 1985 to Max J. Shiff et al., titled "Decorative Ornament Having Garland And A Light String," describes the addition of a center wire and tinsel strip to an electric light cord having a series of lights disposed thereon, as in a Christmas tree light string. The garland does not cover the lights, but rather wraps about the cord of the light string. No disclosure is made of any form of translucent rope, cord, twine, string, or other fiber material being used to cover the lights or installed with the Shiff et al. light cord and garland.

U.S. Pat. No. 4,652,981 issued on Mar. 24, 1987 to Kenneth P. Glynn, titled "Illuminatable Belt," describes a belt comprising a transparent or translucent outer tube having a number of fiberoptic strands therein. A light source is provided at one end of the device, to illuminate the fiberoptic strands. While Glynn does not specifically state that the fiberoptics provide side lighting, i.e., emit light radially, he does state that light is emitted "throughout the entire length of the belt" (last line of abstract). Moreover, Glynn also discloses a "color disc" (column 3, line 13), but no disclosure is made of any means of adjusting the color output by means of the disc. In any event, Glynn makes no disclosure of any form of translucent rope or other fiber disposed about the transparent or translucent tube of his belt.

U.S. Pat. No. 4,778,246 issued on Oct. 18, 1988 to David W. Carroll, titled "High Tensile Strength Compacted Towing Cable With Signal Transmission Element And Method Of Making The Same," describes the replacement of a central structural strand in a length of cable, with a fiberoptic or other non-structural strand to transmit a signal(s) axially along the length of the cable. Carroll is only interested in transmitting a signal(s) along the length of the cable, and does not disclose the use of a central core which emits light radially therefrom, as in the case of the present invention. Such radial emission from the core would teach away from the intent of Carroll, which is to transmit a light (or other) signal from one end of the cable to the other. Moreover, Carroll does not disclose the use of a translucent outer wrap formed of rope, cord, etc., as provided by the present invention.

U.S. Pat. No. 4,820,012 issued on Apr. 11, 1989 to Masaki Asai, titled "Electric Wire," describes a cable intended for carrying high electrical current in electrical power transmission lines. The central core comprises a non-conductive load carrying rope, with an electrically conductive outer cable of copper, aluminum, etc. While Asai states that a fiberoptic cable may be installed in the core of his cable or line, the construction is nevertheless unsuitable for use as an illuminating device due to the opaque copper or aluminum electrical conductor surrounding the core.

U.S. Pat. No. 4,936,647 issued on Jun. 26, 1990 to David W. Carroll, titled "High Tensile Strength Compacted Towing Cable With Signal Transmission Element," is a continuation in part of the '246 U.S. Patent to the same inventor, discussed further above. The earlier '246 and later '647 U.S. Patent are closely related, with the primary difference being that the claims of the later '647 U.S. Patent are primarily directed to a method of manufacturing such cable, rather than to the cable structure itself. The points raised in the discussion of the earlier '246 U.S. Patent are seen to apply here, as well.

U.S. Pat. No. 5,016,973 issued on May 21, 1991 to Thomas P. Hager et al., titled "Cable Reinforcement For An Optical Fiber Cable," describes an assembly having one or more fiberoptic transmission lines within its core, with the fiberoptic lines surrounded by a spun synthetic yarn material. The yarn is in turn covered by a polyethylene outer jacket. The assembly is heated, with the yarn and polyethylene jacket melting together to produce a relatively rigid outer sheath for the internal fiberoptic core material. The Hager et al. cable is intended for the transmission of optical signals, data, and information. No disclosure is made of the use of side light transmitting optical fibers, as used in the present invention for emitting light radially through the surrounding rope or cord outer cover.

U.S. Pat. No. 5,071,118 issued on Dec. 10, 1991 to Letitia G. Barnett, titled "Illuminated Jump Rope Apparatus," describes a handle apparatus which permits the flexible rope component to be extended or retracted therefrom to adjust the overall length of the rope as desired. Barnett states that the rope itself is "preferably treated with a chemically luminescent material" (col. 4, lines 12–13), but she does not disclose the use of electrically powered lighting disposed within the end(s) of the device or along the device to provide illumination for a surrounding rope, cord, etc. covering, as provided by the present illuminated rope invention.

U.S. Pat. No. 5,182,779 issued on Jan. 26, 1993 to William L. D'Agostino et al., titled "Device, System, And Process for Detecting Tensile Loads On A Rope Having An Optical Fiber Incorporated Therein," describes the measurement of changes in the optical properties of a fiberoptic line or cable installed in a rope, due to changes in tension on the rope. D'Agostino et al. use these measurements to determine the tension on the rope, when it is used as a load bearing member. While the basic structure of the D'Agostino et al. assembly, i.e. a fiberoptic line enclosed concentrically within a rope, is similar to the basic structure used in at least some of the embodiments of the present invention, the assembly of D'Agostino et al. differs substantially from the present invention in that D'Agostino et al. do not provide for any lateral or radial passage of light from the fiberoptic cable within the rope. FIGS. 4–6 of D'Agostino et al. show this retention of the light within the confines of the fiberoptic line, and the description of the basic structure in col. 6, lines 36–44 specifically states that "Surrounding core 20 is clad 22, which confines light to core 20 due to its slightly different optical properties." (col. 2, lines 40–42). In contrast, the present fiberoptic cable or line is a side light type material, i.e., configured specifically to emit light radially from the lateral wall(s) or side(s) of the element. The light emitted radially by the fiberoptic or other light transmissive element, then passes into and through the surrounding translucent rope, cord, or other similar material which has been wrapped or otherwise placed around the fiberoptic or light transmissive material, to produce a most attractive display when the lighting is actuated.

U.S. Pat. No. 5,842,766 issued on Dec. 1, 1998 to Harry E. Scharf III, titled "Fiber Optic Jump Rope Device," describes a device similar to that described in the '193 U.S. Patent to Kuhnsman, discussed further above. The Scharf III jump rope is not actually a rope at all, but rather a transparent (as opposed to translucent) flexible plastic tube enclosing a series of fiberoptic strands. In contrast, the present illuminated rope actually uses translucent (as opposed to transparent) rope, cord, or other braided, woven, or twisted fiber, to enclose a light emitting structure and to provide an attractive appearance as light radiates outwardly from the rope or cord.

U.S. Pat. No. 5,850,807 issued on Dec. 22, 1998 to Russell R. Keeler, titled "Illuminated Pet Leash," describes a leash having a steel cable as a central structural core, with the cable being surrounded by fiberoptic lines or strands. The fiberoptic and steel cable assembly is in turn enclosed within an apparently rigid, non-opaque tube. No translucent rope, cord, or other fiber material disposed about the exterior of the leash, is disclosed by Keeler.

U.S. Pat. No. 5,967,095 issued on Oct. 19, 1999 to Kenneth J. Groves, titled "Illuminated Pet Leash," describes the installation of an electroluminescent (EL) light string externally on a leash strap or the like. This configuration is essentially opposite that of the present invention, which incorporates the light emission within the core of the device, and surrounds the light emitting portion of the structure with a translucent rope or other elongate fiber material. The point lighting provided by the series of EL elements in the Groves pet leash, is not at all like the continuous illumination provided by the diffusing effect of the translucent rope or similar material disposed over the outside of the light emitting element of the present invention.

U.S. Pat. No. 6,257,942 issued on Jul. 10, 2001 to J. Steven Groover, titled "Phosphorescent Rescue Line Throw-Bag," describes a transparent container bag containing a phosphorescent rope therein, which may be quickly and easily dispensed from the container.

The throw bag may also include flotation means and a light beacon. The Groover rescue line is intended to provide a visual guide from the rescuer, holding one end of the rope, to the opposite end of the rope which remains connected to the throw bag. Groover does not provide any electrically powered lighting for his phosphorescent rope, but instead relies upon naturally phosphorescent chemicals to provide the lighting for his rope. The rope is intended to be exposed to light while in storage, with the energy from the light exposure providing the phosphorescent effect when the apparatus is needed in darkness. In contrast, the present invention includes an active lighting source or means which illuminates a transparent or translucent element, with the transparent or translucent element in turn being enclosed within a translucent rope, cord, or similar element.

Japanese Patent Publication No. 8-160,895 published on Jun. 21, 1996 to Ikeda Hidekazu et al., titled "Electrically Illuminated Cable," describes (according to the illustrations and English abstract) a wire which is wrapped with an insulating tape, with the two lateral edges of the tape extending laterally from the wire and adhered together. Electrically conductive tapes are applied to the opposite sides of the insulating tape edge, and a series of light emitting diodes (LEDs) are secured about the insulated wire, with their leads straddling the wire and contacting opposite conductive tapes. The LEDs are disposed to the outside of the support wire, insulation, and electrical conductors, with the only disclosure of any form of coating or enclosure, being the coating of components other than the LED bulbs themselves, with an insulating resin material. No rope, fiber, or other translucent cover over the lighting sources, appears to be disclosed in the Japanese Patent Publication.

Finally, a publication from the website www.cnn.com dated Oct. 3, 1997, titled "'Liteline' Brightens The Path For Rescue Workers," describes a device comprising a plastic tube filled with miniature incandescent bulbs. While the plastic tube is described as "rope-like," it is actually not at all similar to a rope, but is rather a transparent, hermetically sealed, monolithic plastic tube which provides a waterproof environment for the lighting contained therein. There is no suggestion in the CNN website publication of any wrapping or other covering of the lighting components with translucent rope, cord, or other elongate fiber or strands of material, as provided by the present illuminated rope invention.

None of the above inventions and patents, taken either singly or in combination, is seen to describe the instant invention as claimed. Thus illuminated rope solving the aforementioned problems is desired.

SUMMARY OF THE INVENTION

The present invention includes numerous embodiments of a series of illuminated articles or objects, each of which incorporates a covering of translucent rope, cord, or similar elongate stranded fiber material. Many of the embodiments comprise elongate fiberoptic cores which emit light radially or laterally therefrom, with a hollow core braided rope or spiral wrap of twisted rope surrounding the fiberoptic core. The rope or similar covering material may include various colors, patterns, etc. embroidered or otherwise installed therein, to provide a more interesting and colorful effect when illuminated. The lighting source may comprise one or more light emitting diodes (LEDs), incandescent, gas discharge, and/or other type(s) of light(s) disposed at one or both ends of the fiberoptic core. The light source may receive its electrical power directly from a conventional electrical source, or may be powered by a modular device disclosed herein. The modular device may also include means for changing the color of the light output therefrom, thereby changing the color of the light emitted from the fiberoptic core element and surrounding rope as well.

Other embodiments of the present invention comprise flexible transparent or translucent tubing containing a series of lights (LEDs, miniature incandescent bulbs, etc.) therein, and surrounded by translucent rope or the like. The present invention also includes a series of relatively small diameter fiberoptic lines, each wrapped or spun with its own individual covering of translucent cord, string, or other fiber, and intertwined together. The flexible nature of such devices, enables them to be formed to any shape or pattern as desired. Where relatively lengthy lines or strands are required, one or more couplings may be used to link two or more individual lines together. At the opposite end of the size spectrum, the translucent central core member may comprise a relatively large diameter length of rigid acrylic material, wrapped with a translucent rope or other similar material. Such an assembly may be used to form an illuminated stairway handrail, the pole for a standing floor lamp, or other rigid structure as desired.

Other embodiments of the present invention incorporate hollow translucent shells of material which may be assembled or installed about another structure (tree, etc.). The structure may be wrapped or otherwise provided with illumination, with the hollow shells then installed around the object and the shells then wrapped with a translucent rope or the like, adhesively or otherwise secured thereto. Alternatively, the translucent shell may be formed as a stand-alone, hollow, internally lighted sculpture or the like, and wrapped with a translucent rope or the like as desired.

Accordingly, it is a principal object of the invention to provide an illuminated rope apparatus, comprising an illuminated, translucent or transparent core material which emits light radially and which is surrounded by a translucent wrap or enclosure of rope or similar stranded fiber material, thereby creating an attractive illuminated display.

It is another object of the invention to provide such an article in which the illuminated translucent core may comprise one or more elongate, flexible or rigid, hollow or solid core lengths of material, or which may alternatively comprise a three-dimensional structure or sculpture.

It is a further object of the invention to provide such an illuminated rope article in which the lighting may comprise one or more light emitting diodes and/or other lighting as desired, with lighting installed at one or both ends of a solid core element or in the center of a hollow element.

Still another object of the invention is to provide a series of modular power elements for the elongate articles of the present invention, providing electrical power for the lighting means used and further enabling the color of the lighting to be adjusted and changed as desired, and further to provide a series of couplings which may be used to connect two or more elements together.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises numerous embodiments of an illuminated rope or the like, in which a transparent or translucent central core component is wrapped or covered with translucent rope, cord, twine, or other elongate stranded fiber, and illuminated internally. The present invention may comprise solid or hollow, elongate strands or three-dimensional sculptures, with lighting of virtually any principle of operation directed to or through the ends of the elongate strands or disposed within the hollow strands or three-dimensional objects. The translucent core material of each of the embodiments, emits light radially therefrom. The result of the present invention is that the light emitted radially from the translucent core structure is diffused by the translucent rope or other fiber material applied to the exterior, to produce an object which is lighted uniformly along substantially its entire length or surface. A series of modules for supplying power for the lighting, changing light color, etc. are also disclosed herein, as well as a series of connectors for joining two or more ends of rope lighting together. A series of exemplary embodiments of the present invention are disclosed herein as well.

Figure 1:
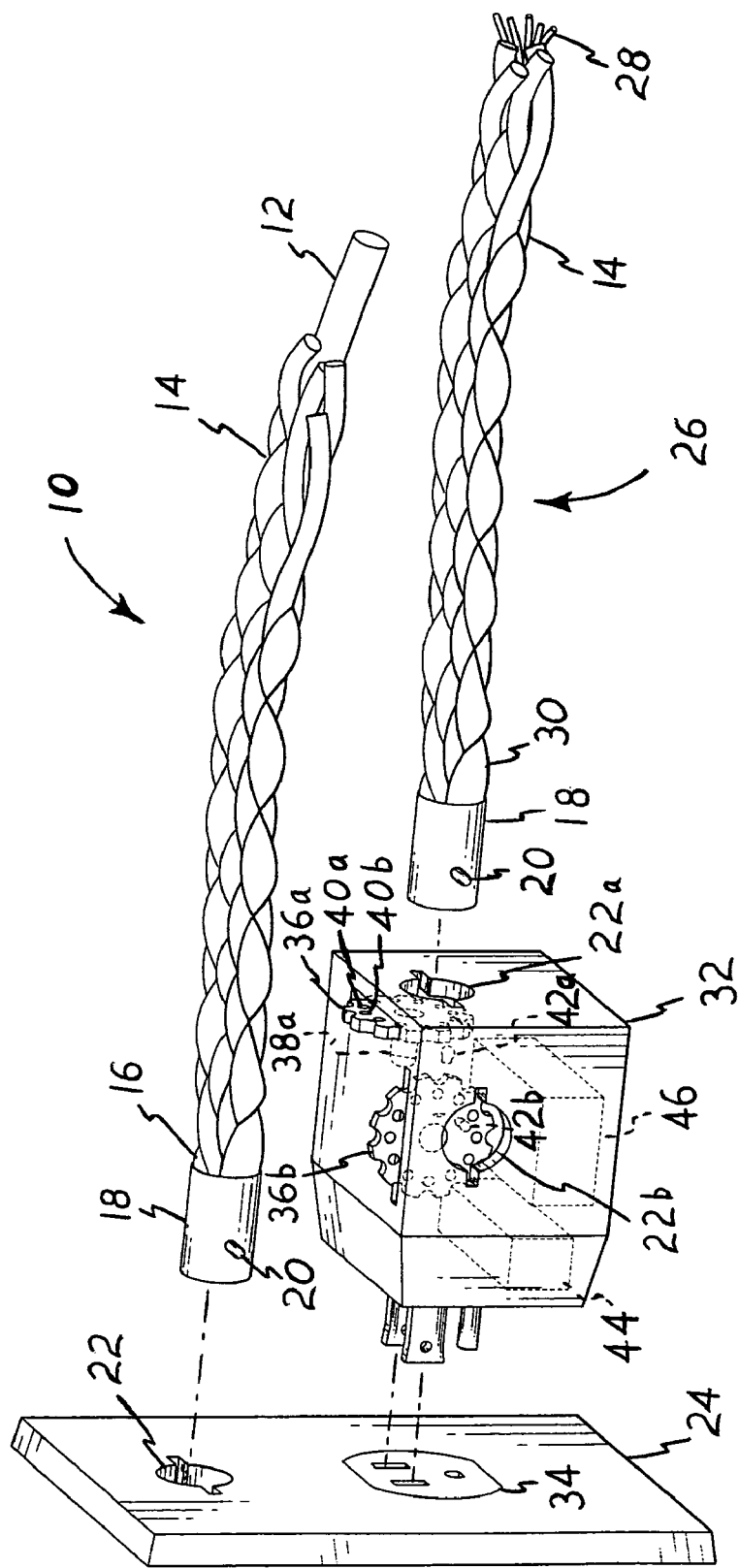
FIG. 1 is an exploded perspective view of a first series of embodiments of the present invention, comprising single and multiple strand, radially emitting fiberoptic cores each surrounded by a translucent hollow core braided rope, with a direct connecting wall outlet and module for use with a conventional outlet.

FIG. 1 of the drawings illustrates a series of embodiments of illuminated elongate elements or optical fibers or lines. A first embodiment 10 comprises an elongate lighted element having a single, relatively large diameter, translucent, solid core component 12 for transmitting light therealong. The core 12 is preferably formed of fiberoptic material, an acrylic plastic, or other suitable material as desired. The core 12 may be formed of relatively soft material to provide flexibility, or may be formed of harder materials and/or of a larger diameter, to provide rigidity if so desired. A point which all of the light transmissive core materials have in common throughout the present disclosure, is that they are "side light" type materials, i.e., they radiate or redirect light therein, radially outwardly therefrom. The surface of the core component 12 may be textured to scatter light therefrom, as known in the art of side light fiberoptics.

The core material 12 is encased within a braided, hollow core rope 14, with the individual braid elements of the rope 14 completely surrounding the core material 12. The rope 14 may be formed of any suitable material, so long as the material has translucent properties. Synthetic materials, such as polyethylene, polyurethane, and other plastics have been shown to be suitable for enclosing the core material 12 while still providing the translucence required to allow the light emitted from the core material 12 to penetrate through the outer rope enclosure 14, thereby illuminating the rope 14. As the rope is not transparent (clear), but is translucent, it serves to scatter or diffuse the light passing outwardly therethrough, and provides the effect of a continuous, uniformly illuminated rope structure 10.

The end 16 of the illuminated rope 10 is fitted with a bayonet type connector 18, i.e., a round sleeve having a pair of opposed pins 20 extending radially therefrom. (Only a single pin 20 is visible in FIG. 1, but the opposed pairing of pins in bayonet fittings is conventional.) The sleeve may be swaged or otherwise secured to the end 16 of the illuminated rope 10, and is configured to fit into the mating bayonet type slotted socket or receptacle 22 of a wall outlet plate 24. The outlet plate 24 includes a suitable light source therein, not shown but equivalent to the light within the modular adapter discussed further below. Conventional switch means, not shown, may be installed within the receptacle 22 to activate the light when the bayonet connector end 18 of the illuminated rope 10 is installed therein. As the end of the bayonet connector sleeve is open, the light source within the receptacle 22 of the outlet plate 24 emits light directly into the end 16 of the illuminated rope assembly 10, i.e., into the fiberoptic core material 12. Light travels along the fiberoptic core material 12 and is scattered radially therefrom by means of its surface treatment, to be emitted generally radially from the core material 12 and through the translucent rope material 14. This causes the rope material 14 to have a glowing, illuminated appearance, with the translucence of the rope material serving to diffuse the light emitted therefrom to produce a substantially uniform light output from the entire rope surface.

An alternative embodiment 26 is illustrated below the first embodiment 10, with the second embodiment 26 being similar to the first embodiment 10, but having a series of flexible, relatively smaller diameter fiberoptic strands 28 captured within the surrounding hollow core braided rope 14. The construction of the illuminated rope 26, with its multiple fine strands of fiberoptic material 28 therein, provides a much more flexible illuminated rope construction, enabling the illuminated rope 28 to be bent and flexed to form shapes and patterns, or draped over another article as desired. The end 30 of the illuminated rope embodiment 26 may also be equipped with a bayonet sleeve fitting or connector 18 and laterally or radially extending pins 20, essentially the same as the connector 18 of the first illuminated rope embodiment 10.

The second embodiment illuminated rope 26 of FIG. 1 is shown removed from the mating bayonet socket or receptacle 22a of a modular adapter 32, which in turn connects mechanically and electrically to a conventional electrical receptacle 34 of the wall outlet plate 24. The adapter 32 includes a series of components which control or permit various functions or operations of the lighting system for the illuminated rope 26, or other illuminated rope having a compatible end fitting. While such modules may have only a single socket or receptacle 22, as in the wall outlet plate 24, the adapter module 32 includes a pair of such sockets, designated as sockets 22a and 22b. Additional sockets could obviously be provided, if so desired. Each of the sockets 22a and 22b may include a color wheel therewith, e.g. wheels 36a and 36b, which may be automated by means of a drive motor, e.g., the motor 38a shown in broken lines to drive the wheel 36a and change the color output by means of a series of differently colored lenses 40a, 40b, etc. A light source. e.g. lights 42a and 42b, is provided for each socket 22a, 22b, etc. to shine from the sockets when activated and illuminate the fiberoptic line and thus the external rope covering of the illuminated rope. The lights are preferably high intensity light emitting diodes (LEDs), but may comprise any type of light as desired, e.g., incandescent, gas discharge, etc. The module 32 may also include a conventional transformer 44 and battery pack 46, shown in broken lines, and/or a timer, etc.

Figure 2:
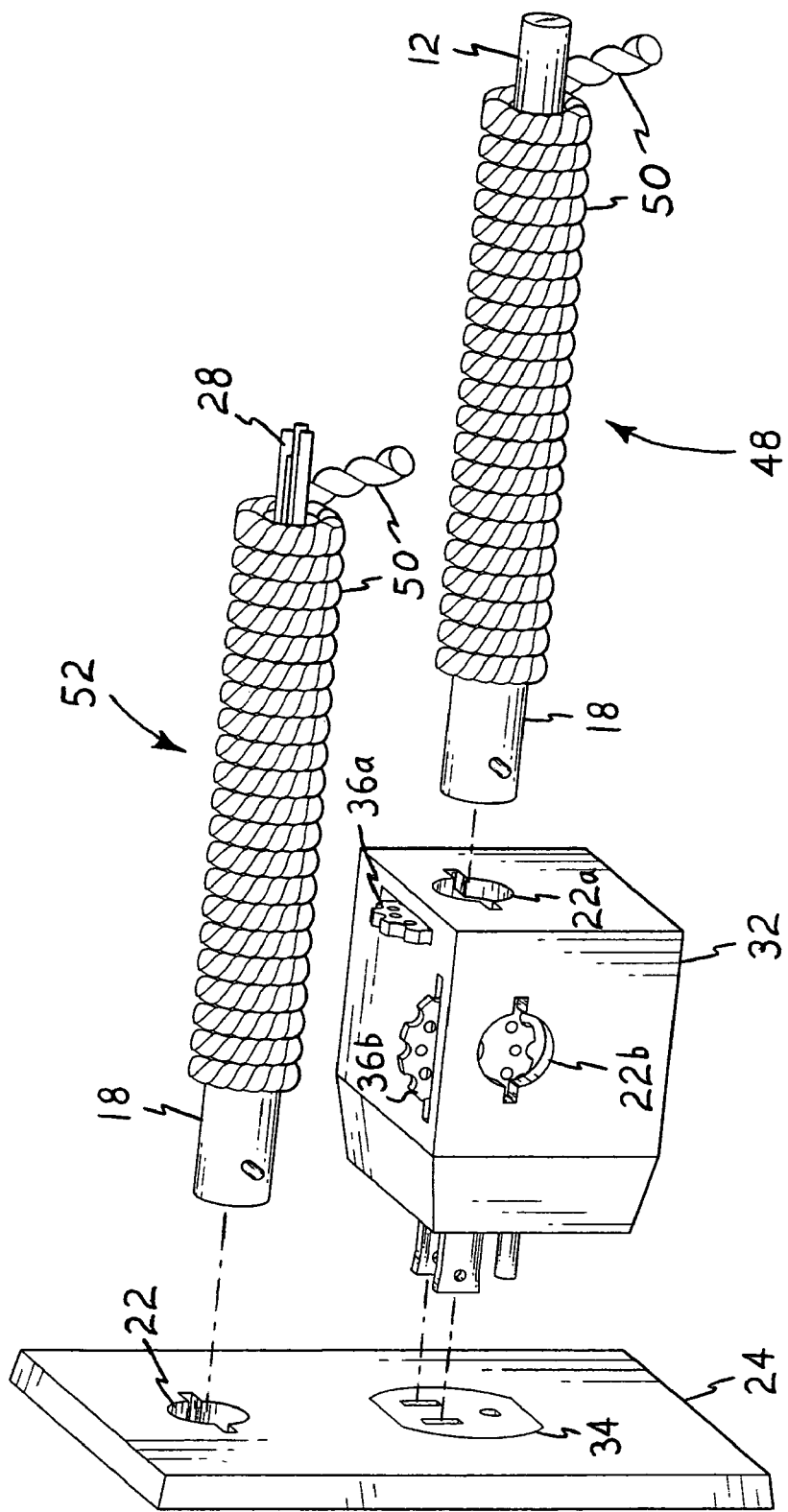
FIG. 2 is an exploded perspective view of a second series of embodiments of the present invention, comprising single and multiple strand, radially emitting fiberoptic cores each spirally wrapped with a translucent fiber twisted rope, with a direct connecting wall outlet and module for use with a conventional outlet.

FIG. 2 illustrates further embodiments of the present illuminated rope invention, wherein the translucent rope used to cover the translucent core component comprises a solid core twisted rope which is wrapped in a spiral pattern around the core material. The embodiment 48 shown in the lower portion of FIG. 2 is similar to the first embodiment 10 of FIG. 1, in that the embodiment 48 also includes a single strand solid core of translucent material 12 and a bayonet type end fitting 18 with its transverse connector pins 20. However, the external rope cover is formed of a length of solid, twisted rope 50, which is wrapped about the single fiberoptic core component 12 in a spiral pattern, from one end to the other.

The upper embodiment 52 of FIG. 2 includes a core 28 formed of a series of relatively fine strands of fiberoptic material, for greater flexibility than the single solid core component 12. This embodiment differs from the illuminated rope embodiment 26 of FIG. 1 by having a translucent rope covering comprising solid core rope 50 wrapped spirally about the multiple strand core 28, with the two embodiments 48 and 52 of FIG. 2 thus having substantially the same external appearance. The upper embodiment 52 of FIG. 2 may also include a bayonet type end fitting 18 configured to fit the corresponding socket(s) 22, 22a, and/or 22b of the wall outlet 24 and/or modular adapter 32 of FIG. 2. These components 24 and 32 of FIG. 2 are essentially identical to the identically numbered components 24 and 32 of FIG. 1, with the adapter 32 of FIG. 2 including the various components illustrated in the adapter 32 of FIG. 1, e.g., color wheels 36a and 36b, transformer and battery pack (not shown in the modular adapter 32 of FIG. 2), light source(s), etc. While the light sources are not shown in the adapter 32 of FIG. 2, it will be understood that the light source(s) of the adapter 32 of FIG. 2 may comprise any of the conventional lights 42a, 42b, etc. shown in the adapter 32 of FIG. 1, with similar conventional lights (not shown) installed in the sockets 22 of the outlets 24 of FIGS. 1 and 2. It will also be noted that the outlets 24 may be conventional, each having two conventional receptacles 34 into which two adapters 34 may be connected, or may be of the configuration shown in FIGS. 2 and 2, or may each include two bayonet or other sockets or outlets 22, as desired.

Figure 3:
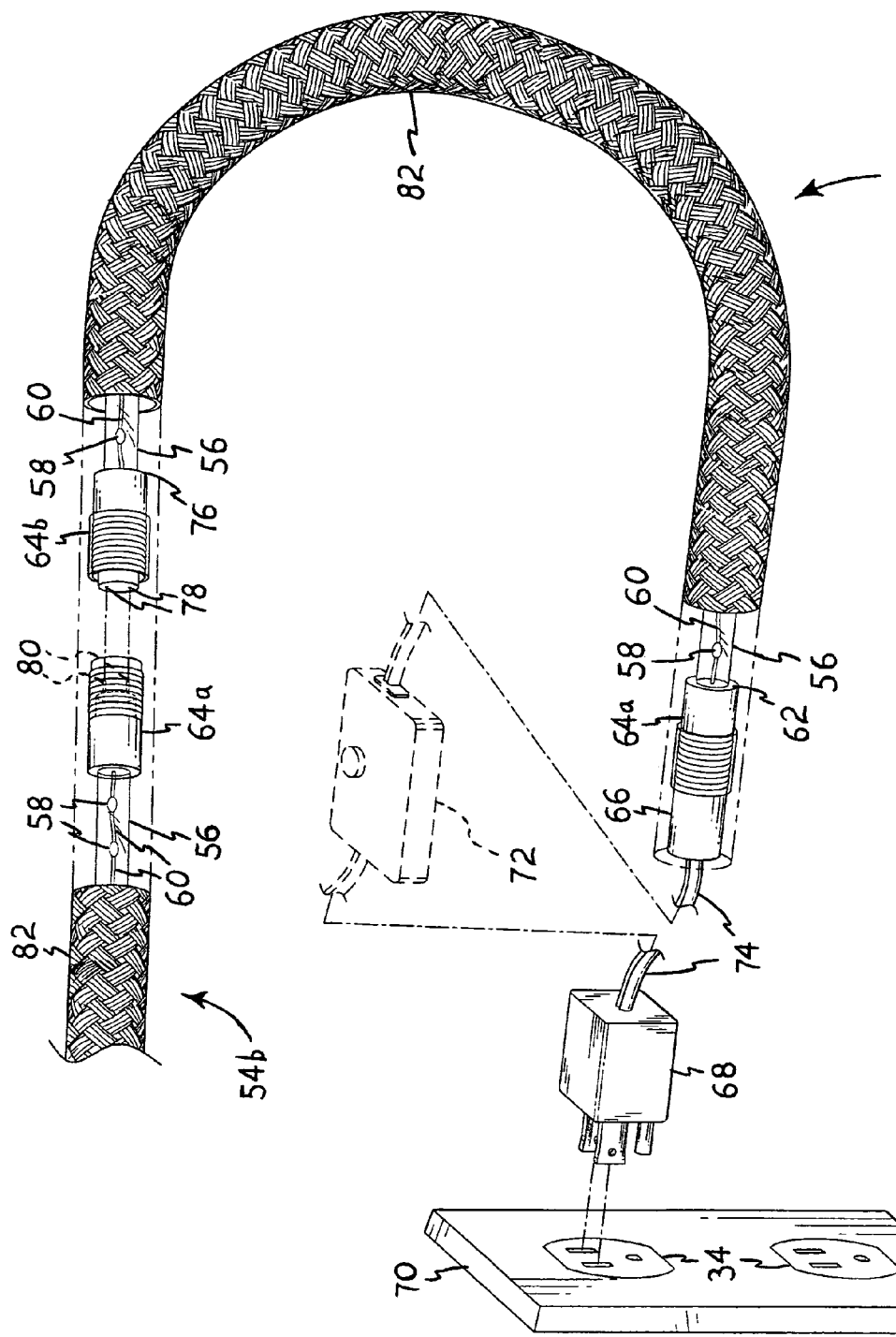
FIG. 3 is an exploded perspective view of a lighting string including a series of individual lighting elements therein and covered by a translucent hollow core braided rope, including an optional adapter module therefore.

FIG. 3 provides an illustration of yet another embodiment 54a of the present illuminated rope invention, in which the translucent core comprises a flexible hollow tube or sleeve 56. The sleeve 56 contains a plurality of small, spaced apart lights 58 therein, connected together by appropriate flexible electrical wiring or connections 60. The first end 62 includes a first electrical connector 64a having a plurality of axially disposed pins (not shown), threadedly engaging a mating electrical connector 66 having a plurality of mating, axially disposed sockets or receptacles therein. The electrical connector 66 is in turn electrically connected to a conventional plug 68 which may be removably connected to a conventional electrical receptacle 34 in a conventional wall outlet 70. Alternatively, a modular control unit 72 (shown in broken lines in FIG. 3) may be included in the electrical cord 74, to function as an on/off switch, timer, etc. as desired. The opposite second end 76 of the illuminated rope embodiment 54a includes a second electrical connector 64b, having a plurality of axial sockets or receptacles 78 therein. These receptacles 78 accept the mating axial pins 80 extending from the mating first end electrical connector 64a of a connecting unit 54b, essentially identical to the first embodiment 54a, which connector 64a of the connecting unit 54b may be threadedly connected to the second end connector 64b of the first unit 54a to extend the length of the illuminated rope as desired. It will be noted that the wall outlet 24 and/or adapter 32 of FIGS. 1 and 2 may incorporate pin and socket type connectors or receptacles configured to connect to mating units, e.g., the connectors 64a and/or 64b of the embodiment 54a, if so desired, and that the various connector means disclosed herein may be adapted to any of the illuminated rope embodiments of the present invention as desired. The translucent sleeves 56 of the internally lighted embodiment 54a and 54b are enclosed in a hollow core braided rope 82, which is passed over the sleeves 56 and various connectors therebetween. The lighting effect is much like that provided by the hollow core braided rope embodiments 10 and 26 of FIG. 1, with the translucent braided rope 82 diffusing the point lighting of the internal lights 58 within the translucent sleeves 56, and providing an even, uniformly distributed light output along the entire length of the device.

Figure 4:
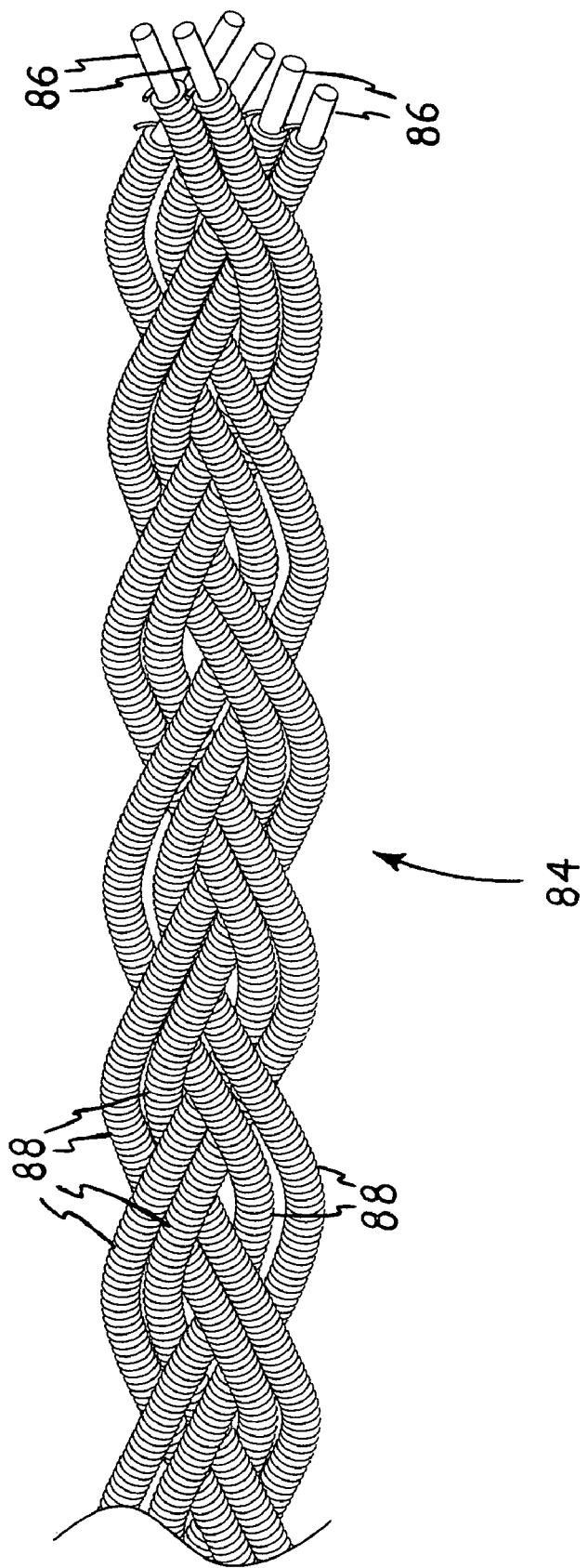
FIG. 4 is a detailed elevation view of a series of relatively small diameter radially emitting fiberoptic strands which have been individually wrapped with a fine translucent fiber and then braided together.

FIG. 4 of the drawings illustrates still another embodiment 84 of the present invention, comprising a plurality of individual fine fiberoptic strands 86, each of which is wrapped or enclosed in a translucent stranded fiber 88 (fine rope, cord, twine, hollow braid, etc.). The fiberoptic strands 86 and their stranded fiber enclosures 88 may be braided together to form an illuminated rope fiberoptic cable 84, generally as shown in FIG. 3. The fiberoptic strands 86 are "side light" type fiberoptics, emitting the light applied to either end thereof, laterally or radially from the strands 86. This illuminates the surrounding rope or stranded fiber material 88 from within, to produce an even, glowing illumination from the fiberoptic cable 84. The ends of the cable 84 may be equipped with the bayonet type end fittings 18 of the embodiments illustrated in FIGS. 1 and 2, or other end fittings configured for passing light therethrough, as desired. The strands could, for instance be embroidered into clothing.

Figure 5:
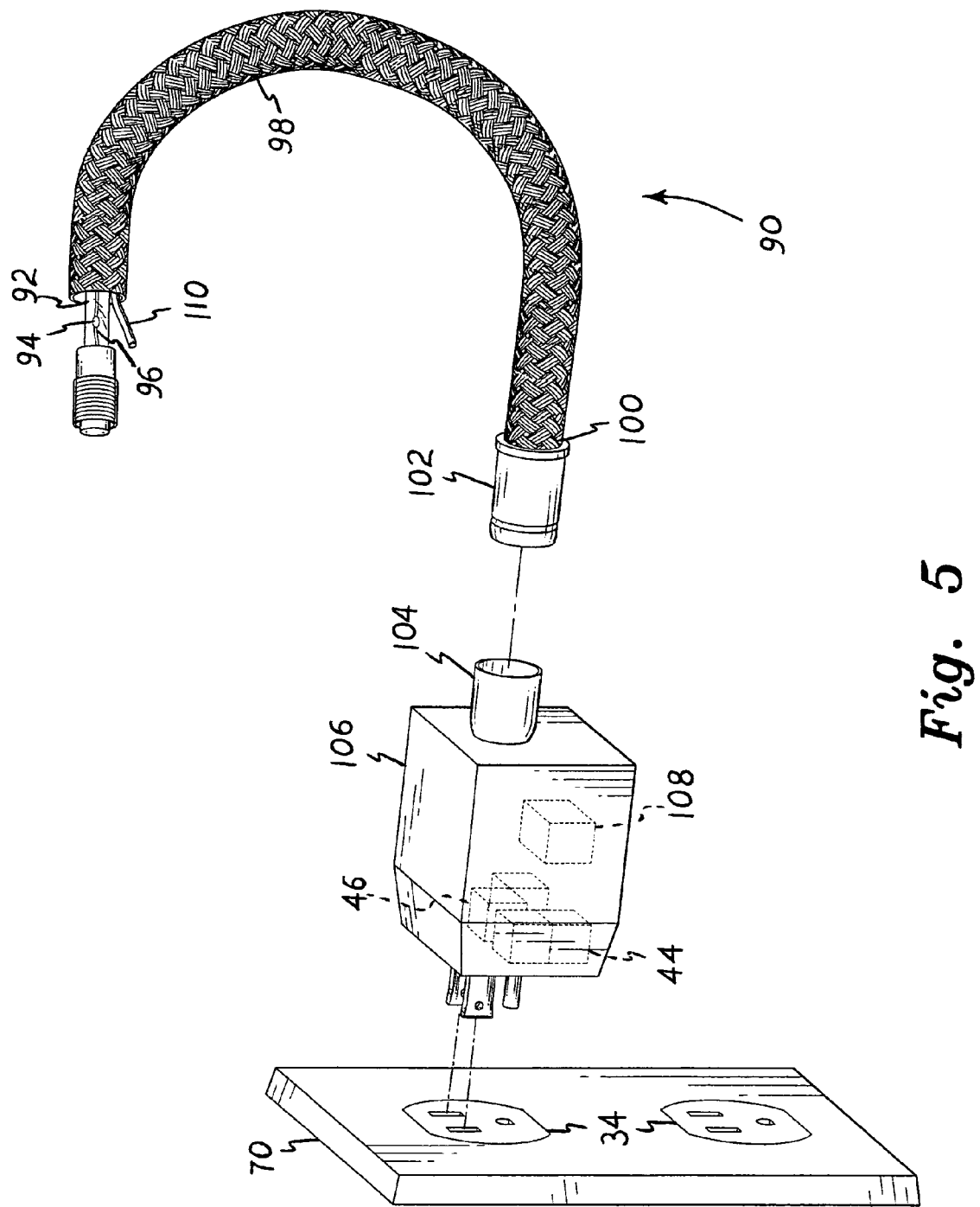
FIG. 5 is an exploded perspective view of a lighting string in accordance with the construction of FIG. 3, but including a stiffening wire therein and showing an alternative control module and connector configuration comprising a plug and socket.

FIG. 5 illustrates a further embodiment 90 of the present invention, essentially comprising a modification of the embodiment 54a, 54b of FIG. 3. The illuminated rope embodiment 90 of FIG. 5 also includes a translucent core comprising a flexible hollow tube or sleeve 92. The sleeve 92 contains a plurality of small, spaced apart lights 94 therein, connected together by appropriate flexible electrical wiring or connections 96. A hollow core, braided rope sleeve 98 is installed concentrically over the outside of the central lighted sleeve 92, in the manner of the hollow core braided ropes used to cover the fiberoptic strands or cables or lighted translucent sleeves of other embodiments disclosed herein. The lights may be multicolored or capable of changing colors to change the appearance of the rope based on the light color. For instance, if the light is green, the rope will appear green. When a white light is used, the rope will appear its natural color.

The first end 100 of the illuminated rope embodiment 90 of FIG. 5 differs from the illuminated rope ends of other embodiments disclosed to this point, in that it includes a cigarette lighter type adapter plug connector 102 extending therefrom. This plug 102 is configured to mate with a corresponding connector socket or receptacle 104 incorporated with a modular adapter 106, which in turn connects to a conventional electrical receptacle 34. The illuminated rope embodiment 90 receives electrical power for its internal lights 94 from the adapter 106, which may incorporate conventional componentry such as a transformer 44, batteries 46, timer 108, etc.

The illuminated rope embodiment 90 of FIG. 5 differs in another aspect from the embodiment 54a and 54b of FIG. 3, by including an elongate bending element 110 installed within the translucent rope or fiber sleeve 98. The bending element may comprise a length of relatively soft metal wire with relatively low springback tendencies, which will tend to hold a set position or angle when bent. This wire or bending element 110 will support the flexible hollow sleeve 92 and its surrounding hollow rope sleeve 98 to whatever angle the wire 110 is formed or bent, thus allowing the illuminated rope assembly 90 to be bent to form any practicable pattern as desired.

Figure 6:
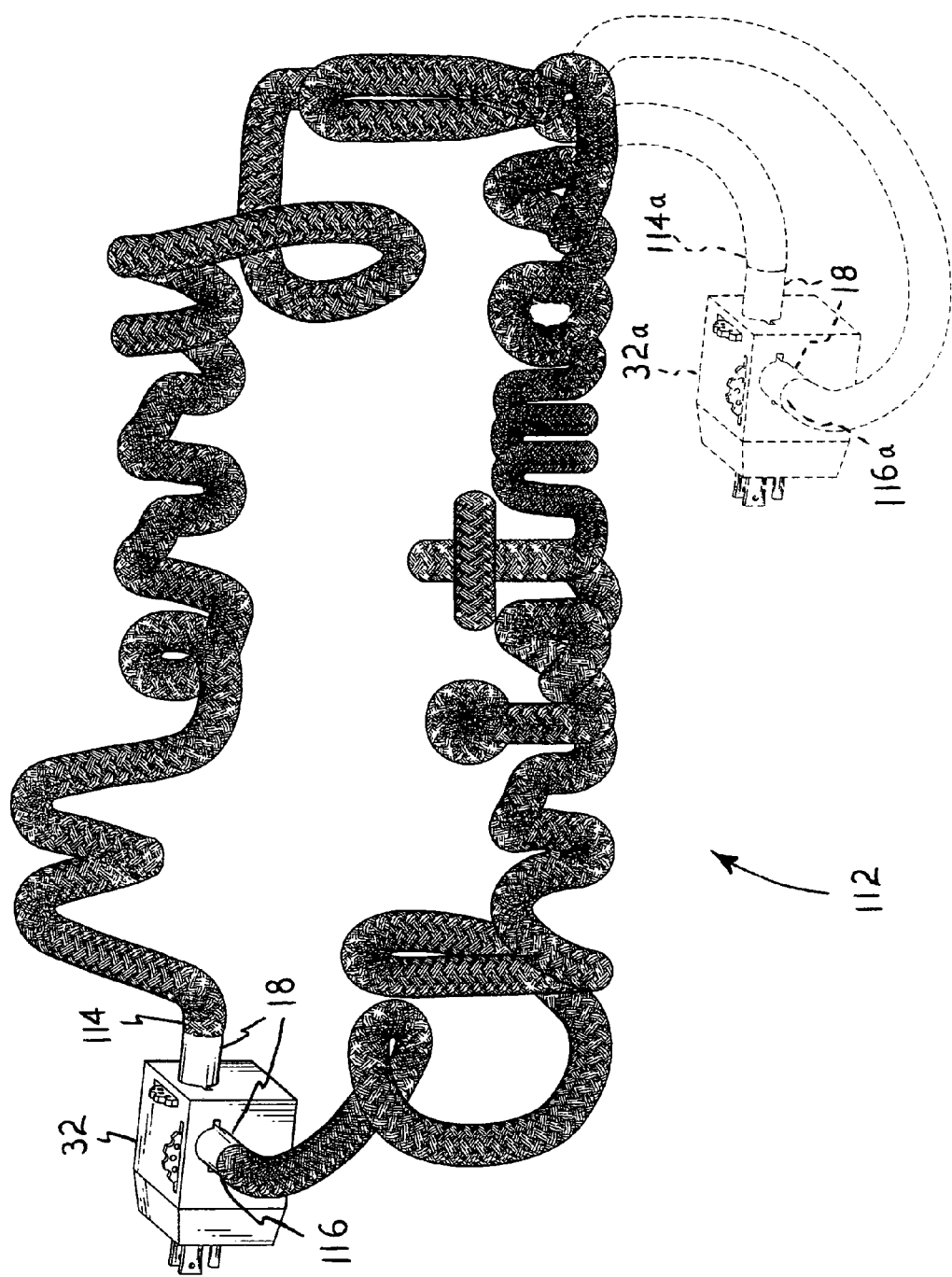
FIG. 6 is an elevation view of an exemplary message formed with the lighting string of FIG. 5, further incorporating an optional second adapter and light source.

FIG. 6 illustrates an example of a pattern which may be formed using such a stiffened illuminated rope structure. The embodiment 112 of FIG. 6 is essentially the same as the more flexible second embodiment 26 of FIG. 1, excepting the inclusion of a stiffening or bending element therein (not shown in FIG. 6, but essentially the same as the element 110 shown in FIG. 5 and described further above). The opposite first and second ends 114 and 116 are equipped with essentially the same fittings as provided for the illuminated rope embodiments of FIGS. 1 and 2, i.e., "bayonet" type connectors 18 having transverse pins which engage corresponding slots formed within a mating receptacle in an outlet, module 32, or other light source as desired. In the event that the pattern to be formed (e.g., "Merry Christmas!" or other words, phrase, design, etc. as desired) requires a length of illuminated rope which is too long to be properly illuminated from its two opposite ends 114 and 116, two or more shorter lengths of illuminated rope may be used, with the alternative ends 114a and 116a being connected to a second module 32a. Such an alternative configuration is illustrated in FIG. 6 by the alternative illuminated rope ends 114a and 116a and the alternative second module 32a, shown in broken lines. It will be seen that a wire stiffener or bending element may be installed with any of the embodiments disclosed herein, whether they be of the fiberoptic principle, as in the case of the embodiments of FIGS. 1, 2, 4, and 6, or of the principle incorporating a plurality of internal lights, as in the embodiments of FIGS. 3 and 5, discussed to this point.

Figure 7:
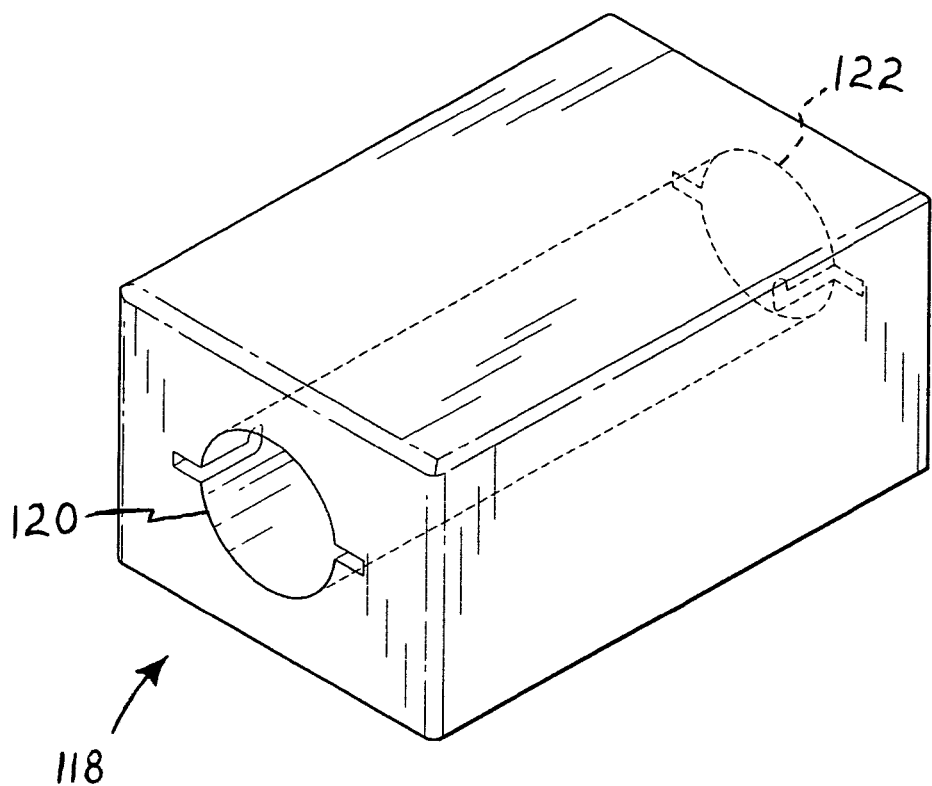
FIG. 7 is a perspective view of a first embodiment of a connector for the various lighted rope devices of the present invention, comprising a two way connector.
Figure 8:
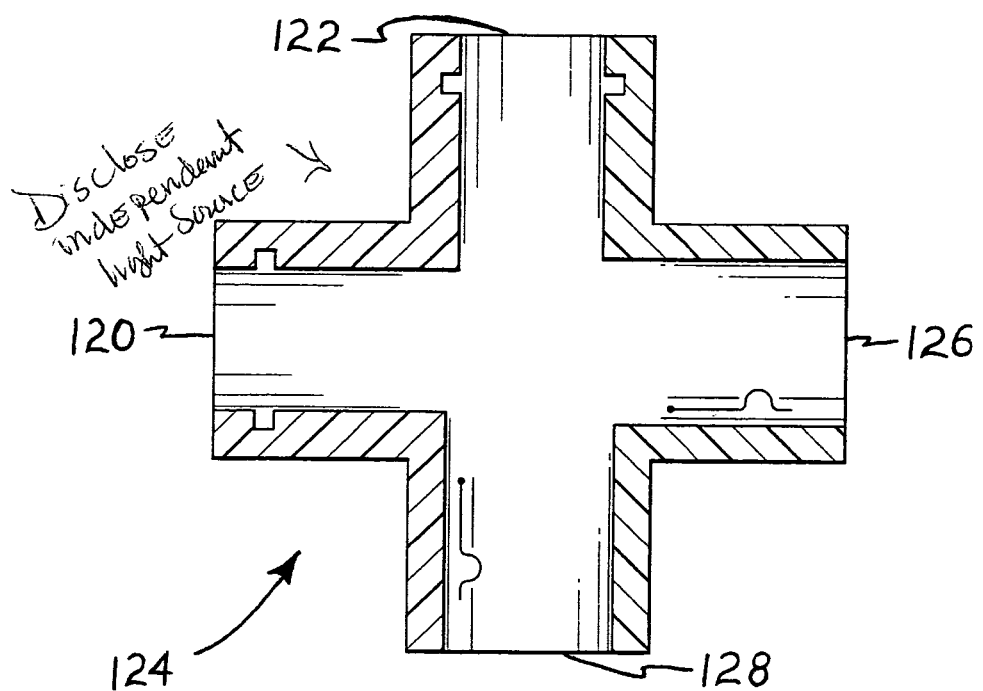
FIG. 8 is an elevation view in section of a second embodiment of a connector for the various lighted rope devices of the present invention, comprising a four way connector configured for fitting the connector ends of the lighted ropes illustrated in FIGS. 1, 2, and 5.
Figure 9:
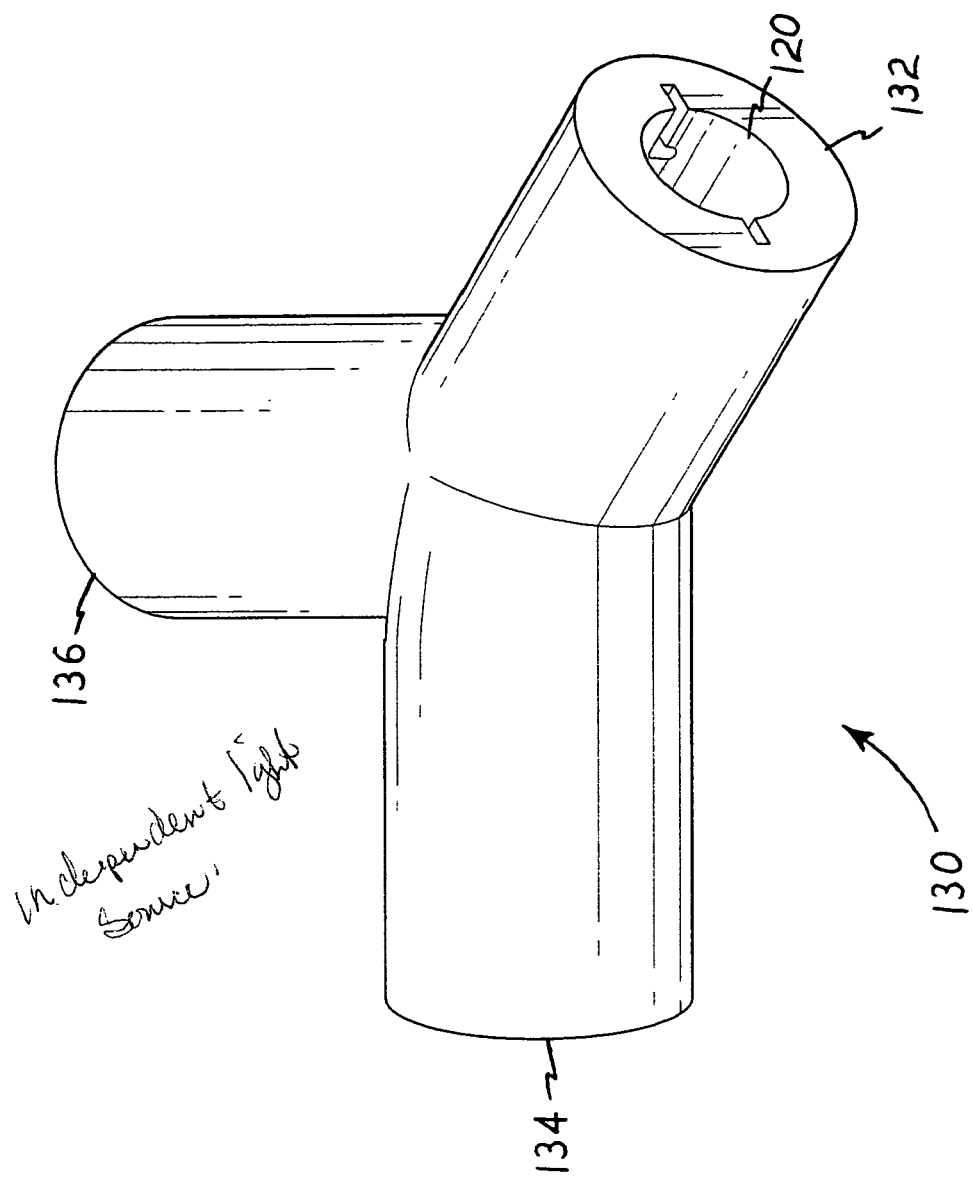
FIG. 9 is a perspective view of a third embodiment of a connector for the various lighted rope devices of the present invention, comprising a three way connector.

FIGS. 7 through 9 illustrate various embodiments of connectors which may be used to connect two or more of the present illuminated ropes together as desired. FIG. 7 illustrates a dual receptacle connector 118, having opposed receptacles 120 and 122 disposed coaxially with one another. This connector 118 is particularly well suited for connecting multiple lengths of illuminated rope together, where no electrical connection nor light amplification is required. It will be seen that where light amplification is required, a connector module 32 or the like may be used to connect the illuminated ropes together as required. It will also be noted that while the receptacles 120 and 122 of the connector 118 of FIG. 7 are of the "bayonet" type, that other receptacle types or configurations may be used as desired.

FIG. 8 illustrates a top plan view in section of another alternative connector embodiment, comprising a four way connector 124. The connector 124 includes a pair of "bayonet" type receptacles 120 and 122 therein, but also includes a pair of receptacles 126 and 128 configured for receiving a cigarette lighter type electrical connector, such as the illuminated rope connector 102 of the illuminated rope embodiment 90 of FIG. 5. Conventional reflector means (mirrors, prisms, etc.), not shown, may be installed within the four way connector 124 to guide light from one branch to another orthogonal branch of the connector, and/or conventional electrical connection means may be installed within the connector 124 to connect adjacent illuminated rope elements electrically, as required. Alternatively, other connector types, e.g., the socket type electrical connector 64b illustrated at the second end 76 of the light string illuminated rope embodiment 54a of FIG. 3, may be incorporated with such connectors, if so desired.

FIG. 9 illustrates yet another connector embodiment, comprising a three way connector 130. While only the "bayonet" type receptacle 120 of the first end 132 is visible in the perspective view of the three way connector 120 of FIG. 9, it will be seen that the other two ends 134 and 136 may incorporate identical receptacles 120, or different receptacle types, e.g. the cigarette lighter socket type 128 of the connector 124 of FIG. 8, socket type connectors 64b of FIG. 3, etc., as desired.

Figure 10:
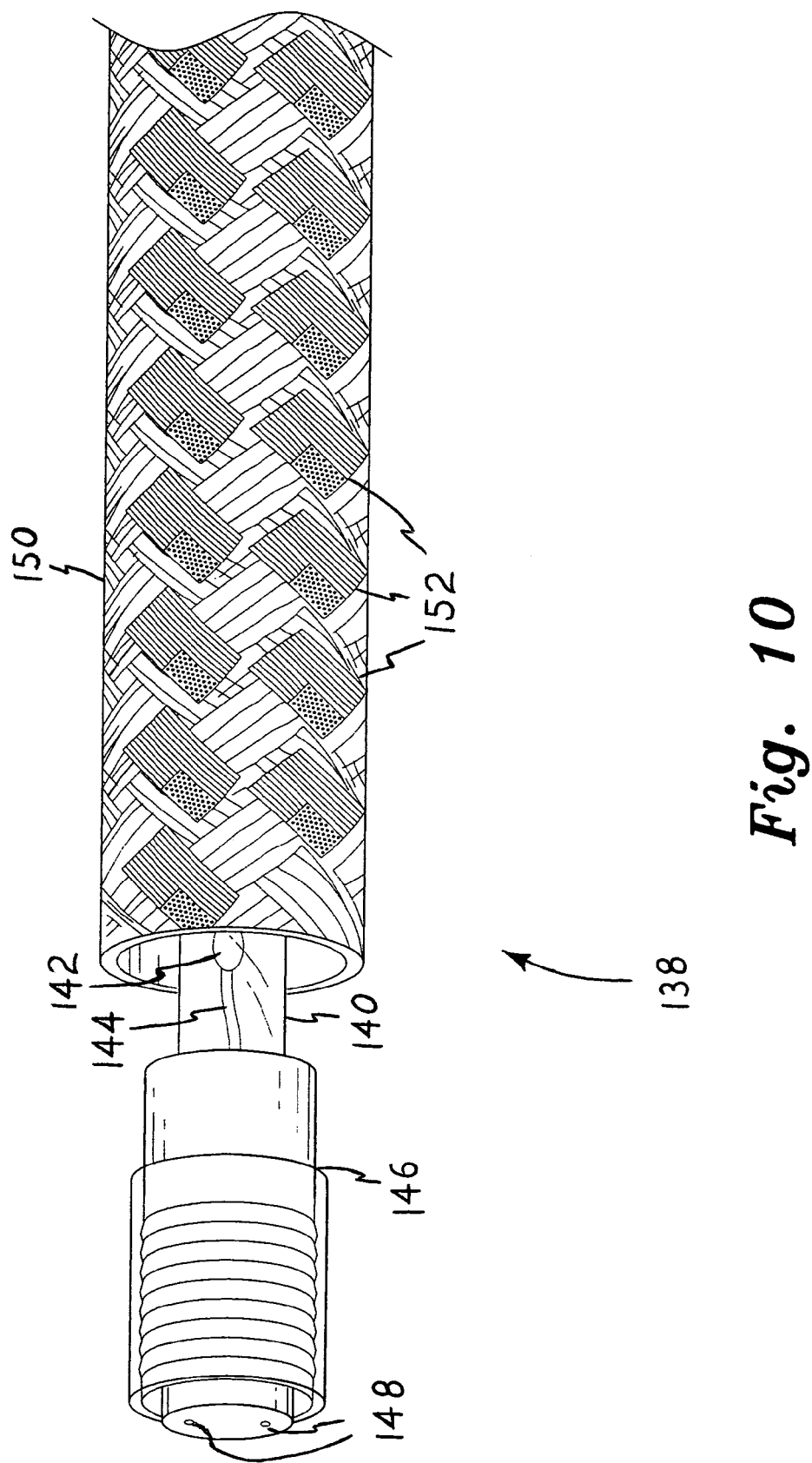
FIG. 10 is a detailed perspective view of an end connector component of the lighting string of FIG. 3, but illustrating an alternative braided translucent cover sleeve incorporating a series of embroidered or otherwise formed patterns or designs therein.

FIG. 10 illustrates an additional embodiment of the present illuminated rope, wherein a patterned translucent fiber or rope is disposed over the lighted core. In FIG. 10, an illuminated rope embodiment 138 includes a translucent core sleeve 140 incorporating a plurality of lights 142 therein, electrically connected by internal wiring 144. A connector 146 incorporating pin receptacles 148 provides electrical connection for the internal lighting 142. These components will be seen to be identical or equivalent to the corresponding sleeve 56, lights 58, wiring 60, connector 64*b*, and pin receptacles 78 of the embodiments 54*a* and 54*b* of FIG. 3. For the purposes of the embodiment 138 of FIG. 10, a fiberoptic illumination principle as used in the embodiments of FIGS. 1 and 2, also works well. The illuminated rope embodiment 138 of FIG. 10 differs from other embodiments by having a patterned, hollow core braided rope sleeve 150 installed over the translucent core sleeve or tube 140. It is well known in the rope manufacturing industry, to weave, embroider, or otherwise form a pattern of contrasting thread color(s) into the braid or weave of an otherwise conventional hollow core braided rope. The present invention may make use of such technology by installing such a patterned braided rope 150 over the illuminating tube or sleeve 140 of the device, thereby illuminating the braided rope pattern. The pattern formed may be any practicable design as desired, depending only upon the designer and the programming of the machinery used to form the pattern in the rope. American flags 152, sports team emblems, or any other pattern as desired may be used with the present illuminated rope invention.

Figure 11:
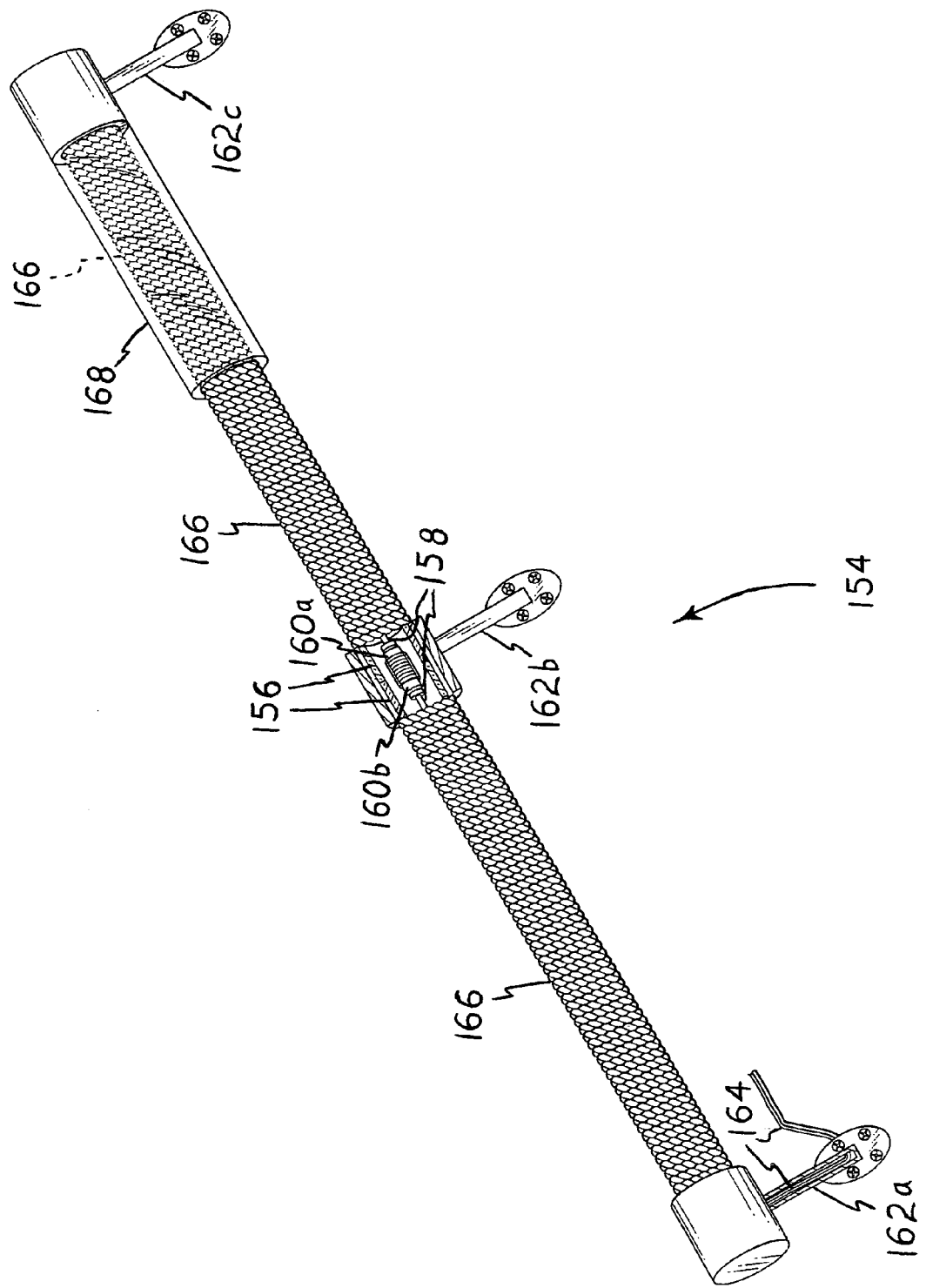
FIG. 11 is a side elevation view of a stairway handrail constructed in accordance with the present invention, comprising a rigid, hollow translucent tube containing lighting therein and spirally wrapped with rope, with an optional translucent shell disposed over a portion thereof.

FIG. 11 illustrates yet another embodiment 154 of the present invention, comprising a rigid stair handrail or the like. The handrail embodiment 154 includes a rigid, translucent tube 156 (acrylic plastic, etc.) which contains a light string 158 therein, similar or identical to the light string components 56 through 60 of the embodiment 54*a* of FIG. 3. Connectors 160*a*, 160*b* may be used as required to connect light strings 158 within the tubular rails 156. The rails 156 may be joined at the various support stanchions 162*a* through 162*c* supporting the rail, with the stanchions also carrying the electrical wiring 164 for the device, as shown by the broken away first stanchion 162*a*.

As in the case of the other illuminated rope embodiments of the present invention, the translucent tubular structure 156 is covered with a translucent rope 166. As the handrail tube 156 is of relatively large diameter, preferably a solid core rope 166 is used, and is wrapped generally circumferentially about the handrail tube 156 in a tight spiral pattern. Alternatively, a hollow core braided rope may be used, if such a rope having a sufficiently large internal diameter is available. The translucent rope material 166 is subject to a fair amount of wear and tear due to hands gripping the rail, and the rope 166 may be deemed to be undesirably harsh to the grip of many users. Accordingly, the handrail embodiment 154 may include a translucent tubular overlay sleeve 168 disposed over the rope material 166, which in turn surrounds the rigid translucent support tube(s) 156. While the translucent overlay sleeve is shown extending only partially along the handrail 154 for clarity in the drawing Fig. and to include various alternatives in a single drawing Fig., it will be understood that normally such an overlay would be installed to cover the entire handrail and its translucent rope wrapping 166.

Figure 12:
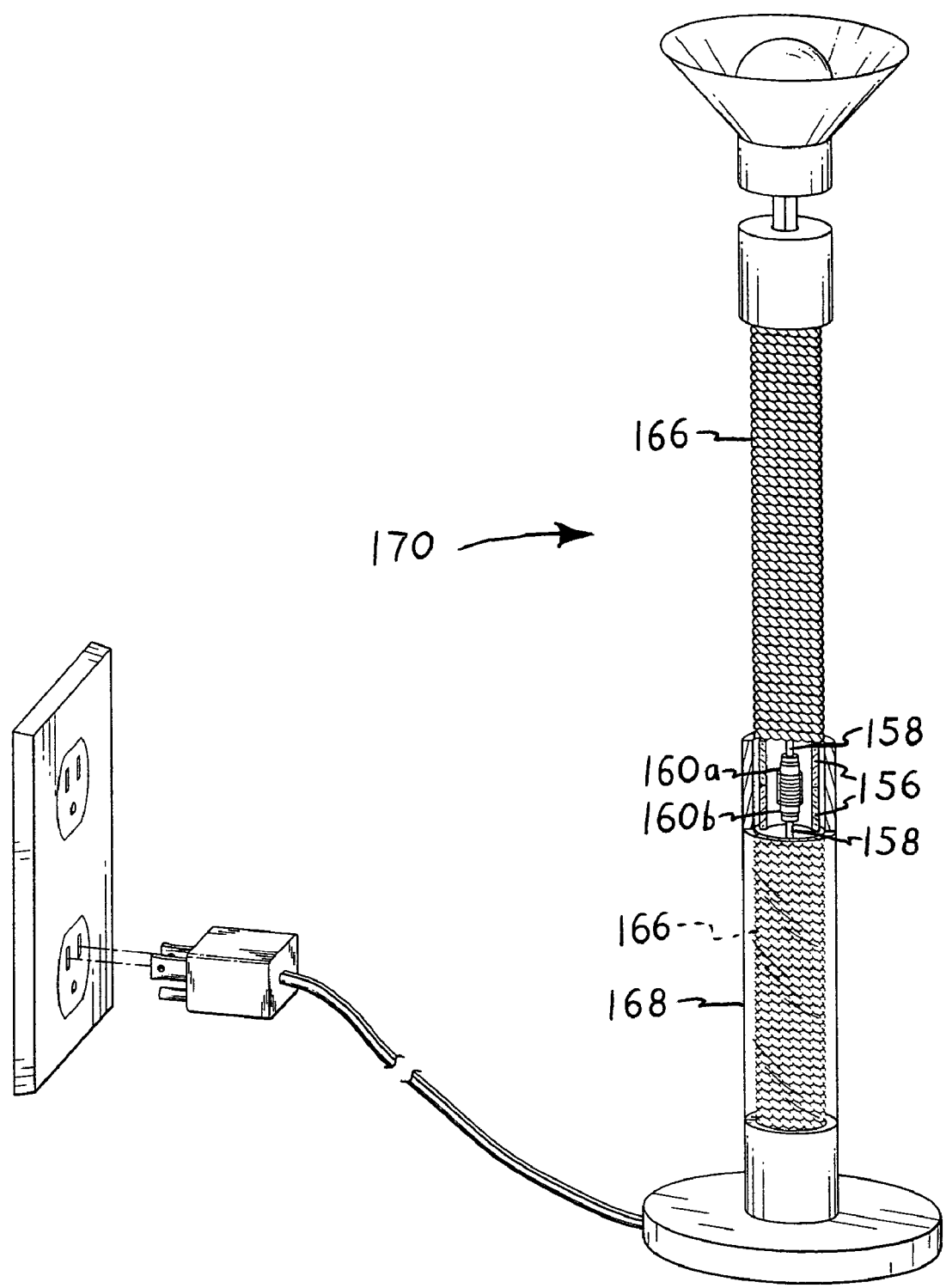
FIG. 12 is a perspective view of a floor lamp having a pole incorporating the construction of the stairway handrail of FIG. 11.

FIG. 12 is an illustration of a variation upon the structure of the handrail 154, comprising a floor or standing lamp embodiment 170. It will be noted that such a structure requires a rigid support, with the rigid structure of the stairway handrail embodiment 154 of FIG. 11 lending itself well to adoption for use as a floor lamp support with relatively little modification. The floor lamp embodiment 170 of FIG. 12 includes a support pole comprising a rigid, translucent tube 156 (acrylic plastic, etc.) which contains a light string 158 and connectors 160*a*, 160*b* (as needed) therein, with the light string components 158 through 160*b* being essentially the same as those identically numbered components of the stairway handrail 154 of FIG. 11. The hollow translucent tube 156 provides an internal passage for the conventional lamp wiring (not shown) as well, with such lamp wiring conventionally passing through the interior of a hollow support tube or pipe in such floor lamps. The stairway rail could also be solid acrylic with LEDs disposed along the length of the rail or on the ends.

As in the case of the other illuminated rope embodiments of the present invention, the translucent tubular structure 156 of the floor lamp embodiment 170 of FIG. 12 is covered with a translucent fiber material, e.g. rope 166. As in the case of the handrail tube 156, the floor lamp tube 156 is also of relatively large diameter. Accordingly, a solid core rope 166 is preferably used to enclose the floor lamp tube 156, with such solid core rope 166 being wrapped generally circumferentially about the floor lamp tube 156 in a tight spiral pattern. Alternatively, a hollow core braided rope may be used, if such a rope having a sufficiently large internal diameter is available. As in the case of the handrail embodiment 154 of FIG. 11, the floor lamp embodiment 170 of FIG. 12 may include a translucent tubular overlay sleeve 168 disposed over the rope material 166, which in turn surrounds the rigid translucent support tube(s) 156. As in the case of the stairway handrail 154 of FIG. 11, the translucent overlay sleeve 168 of the floor lamp 170 of FIG. 12 is shown extending only partially up the floor lamp support tube and rope assembly 156, 166. It will be understood that normally such an overlay sleeve 168 would be installed to cover the entire floor lamp support and its translucent rope wrapping 166.

Figure 13:
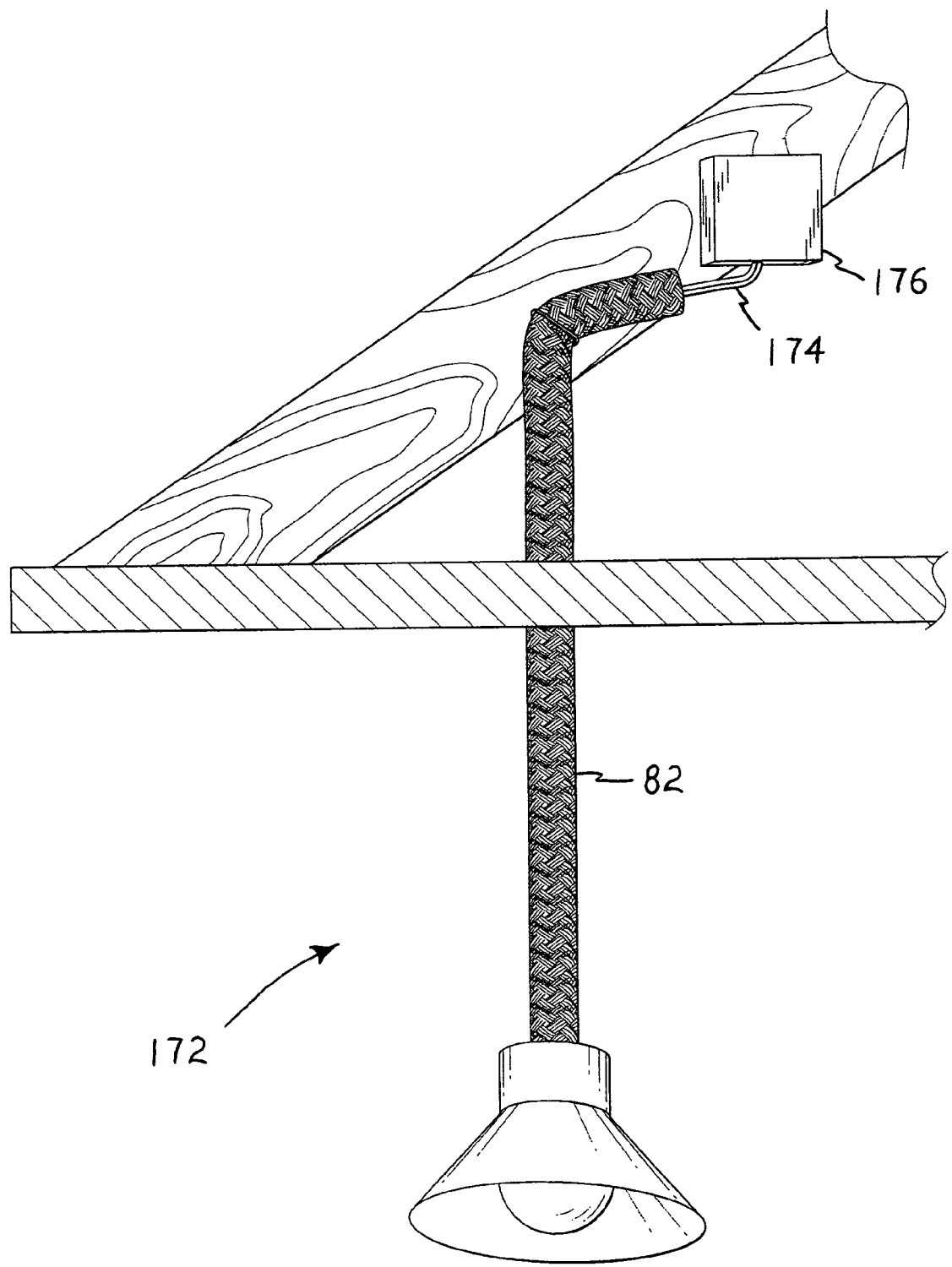
FIG. 13 is a perspective view of a hanging or swag lamp, with the suspension support including radial lighting therein or therealong and a translucent rope cover.

FIG. 13 illustrates still another embodiment of the present illuminated rope invention, comprising a hanging or swag type lamp 172. The lamp 172 is suspended by its electrical power cord 174 and/or other structural support extending from overhead, as is known with such lamps. The support cord or line 174 includes a lighted string, similar to the lighted string shown in FIGS. 3 and 10 through 12, or a fiberoptic line or cable, similar to the fiberoptic devices illustrated in FIGS. 1 and 2. Electrical control for changing the color, intensity, etc. of the lighting of the fiberoptic line or illuminated string may be provided by means of a control box 176, which may function similarly to the modular adapter 32 illustrated in FIGS. 1 and 2, and discussed further above. The assembly comprising the lamp power and/or support cord or line 174 and fiberoptic or lighted string, is in turn surrounded by an illuminated rope material of some sort, e.g., the hollow core braided rope material 82 illustrated in FIG. 3 of the drawings, or other translucent rope material as desired.

Figure 14:
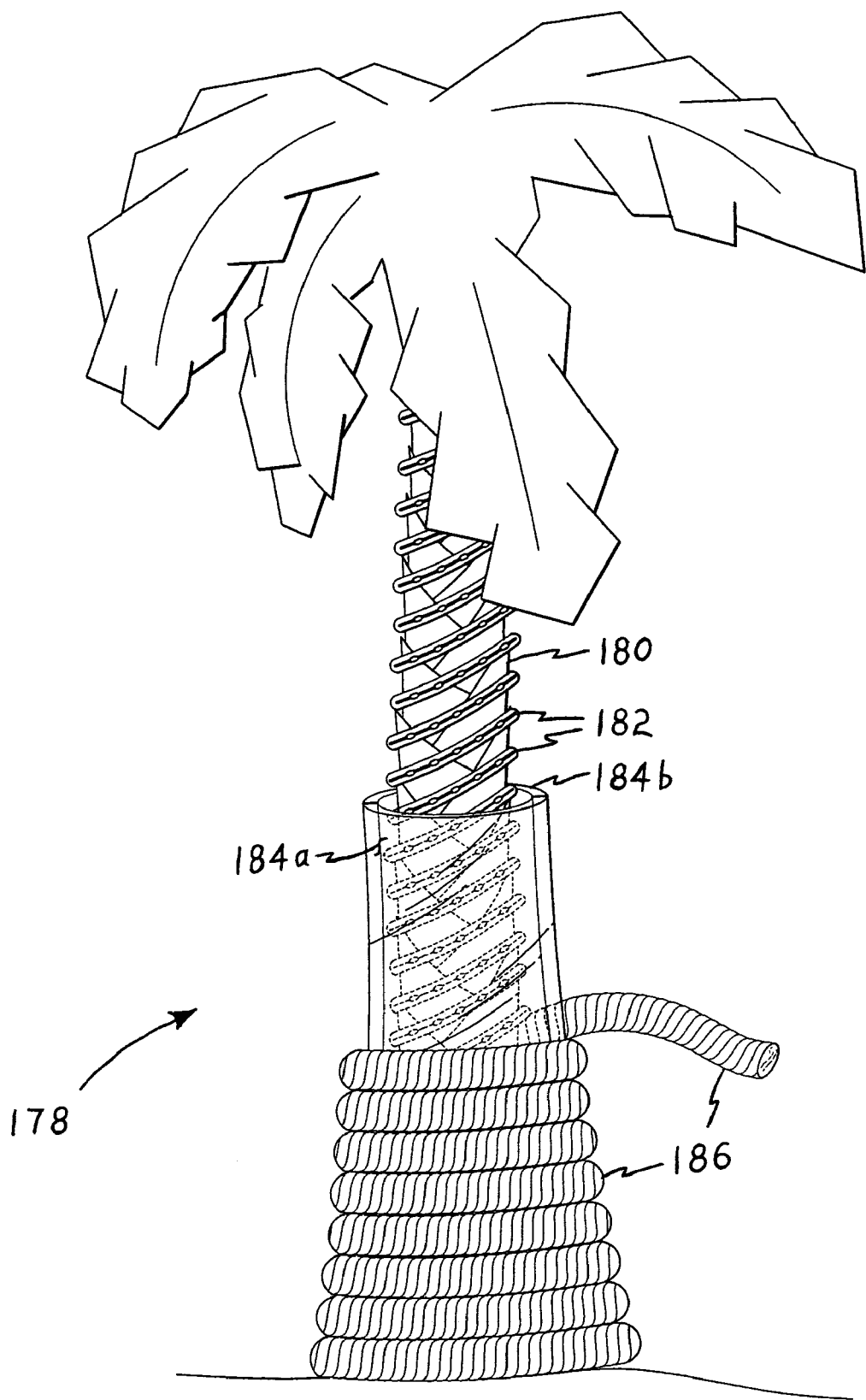
FIG. 14 is an elevation view of another embodiment of the present invention with portions thereof broken away, showing a tree or structure wrapped with a light string and covered by a translucent shell which is in turn wrapped with a translucent rope.

FIG. 14 is an illustration of still another embodiment 178 of the present invention, in which the present illuminated rope invention is used to illuminate an existing support structure. In FIG. 14, the trunk 180 of a tree is wrapped with a light string 182, which may be similar to the light strings comprising components 56 through 68 of FIG. 3, or the light strings comprising components 158, 160*a*, and 160*b* of the stairway handrail and floor lamp embodiments, respectively of FIGS. 11 and 12. Alternatively, a fiberoptic line or lines, similar to the fiberoptic lines 12 and 28 illustrated in the embodiments of FIG. 1, may be wrapped or otherwise installed about the tree trunk 180. A translucent core comprising a pair of translucent, semicylindrical shells 184*a*, 184*b* is placed around the tree trunk 180 and light string 182 (or other lights) wrapped or installed therearound, and finally, a translucent stranded fiber material, e.g. a solid core twisted rope 186 or other suitable translucent rope material or the like, is wrapped or otherwise installed to surround the two translucent semicylindrical shell components 184*a* and 184*b* comprising the translucent core.

It will be noted that the semicylindrical shell components 184*a*, 184*b* are shown extending only partially up the tree trunk 180 in order to more clearly show the light string 182 wrapped therearound, with the rope 186 shown wrapped only partially around the illustrated shell components 184a, 184b in order to clearly show those components. Ordinarily, the translucent shell components 184a, 184b would extend along substantially the entire length or height of the support structure 180, with the rope 182 covering substantially all of the translucent shell. It will also be noted that the above illuminated rope embodiment 178 may be installed about any suitably shaped support structure, e.g., a pole, column, etc. as desired, with the tree trunk 180 illustrated in FIG. 14 merely being an exemplary support structure for the illuminated rope embodiment 178. In any event, the result is an attractive, evenly lighted display, with the rope having a glowing appearance due to the diffusion of light passing therethrough due to its translucence.

Figure 15:
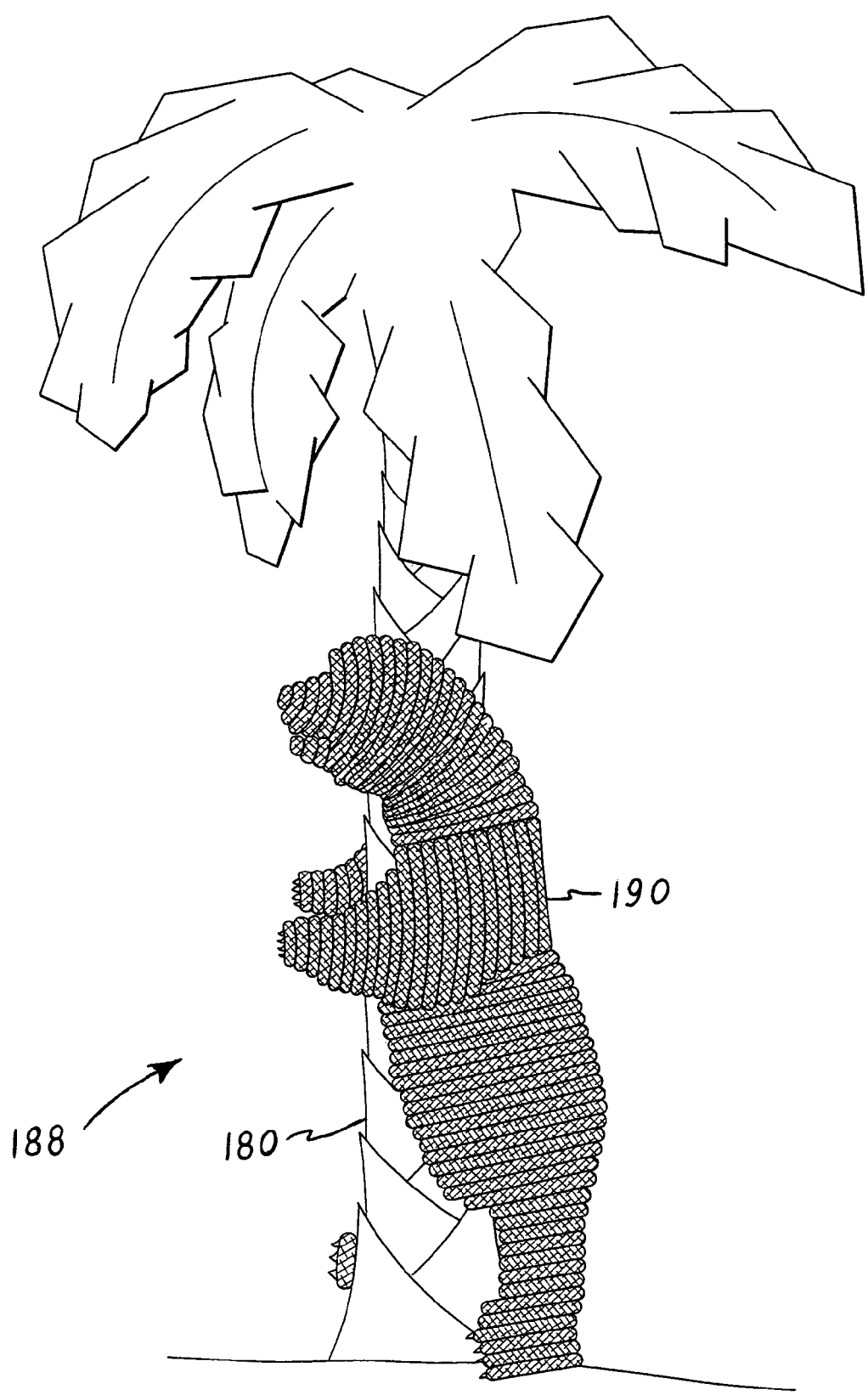
FIG. 15 is an elevation view of a structure comprising a hollow, internally lighted three-dimensional translucent shell supported by an opaque structure, and wrapped with translucent rope.

FIG. 15 illustrates a variation upon the embodiment 178 of FIG. 14, with the embodiment 188 of FIG. 15 comprising a three-dimensional structure. The three-dimensional sculpture or structure embodiment 188 of FIG. 15 is shown in its completed state, as structurally the embodiment 188 is similar to the support structure embodiment 178 of FIG. 14. In FIG. 15, a tree trunk 180, essentially the same as the tree trunk 180 used for the embodiment 178 of FIG. 14, is wrapped or strung with lights, not shown in FIG. 15, but essentially the same as the lighting described for use in the embodiment 178 of FIG. 14. A hollow translucent shell forming a three-dimensional sculpture when assembled, e.g., an animal, cartoon caricature, regular or irregular polyhedron or other geometric shape, etc., is then installed about the tree trunk 180 or other support structure to surround the lighting which has been previously installed thereon. Finally, the three-dimensional translucent shell is wrapped or otherwise covered with translucent stranded fiber material 190 (solid core twisted rope, etc.) to complete the assembly. The rope 190 may be adhesively attached to the underlying three-dimensional translucent shell, to assure its attachment over the irregular contours of the shell. (The hollow, translucent three-dimensional shell is not shown directly in FIG. 15 due to the completed rope covering, but will be understood to form the shape underlying the completed rope covering.)

Figure 16:
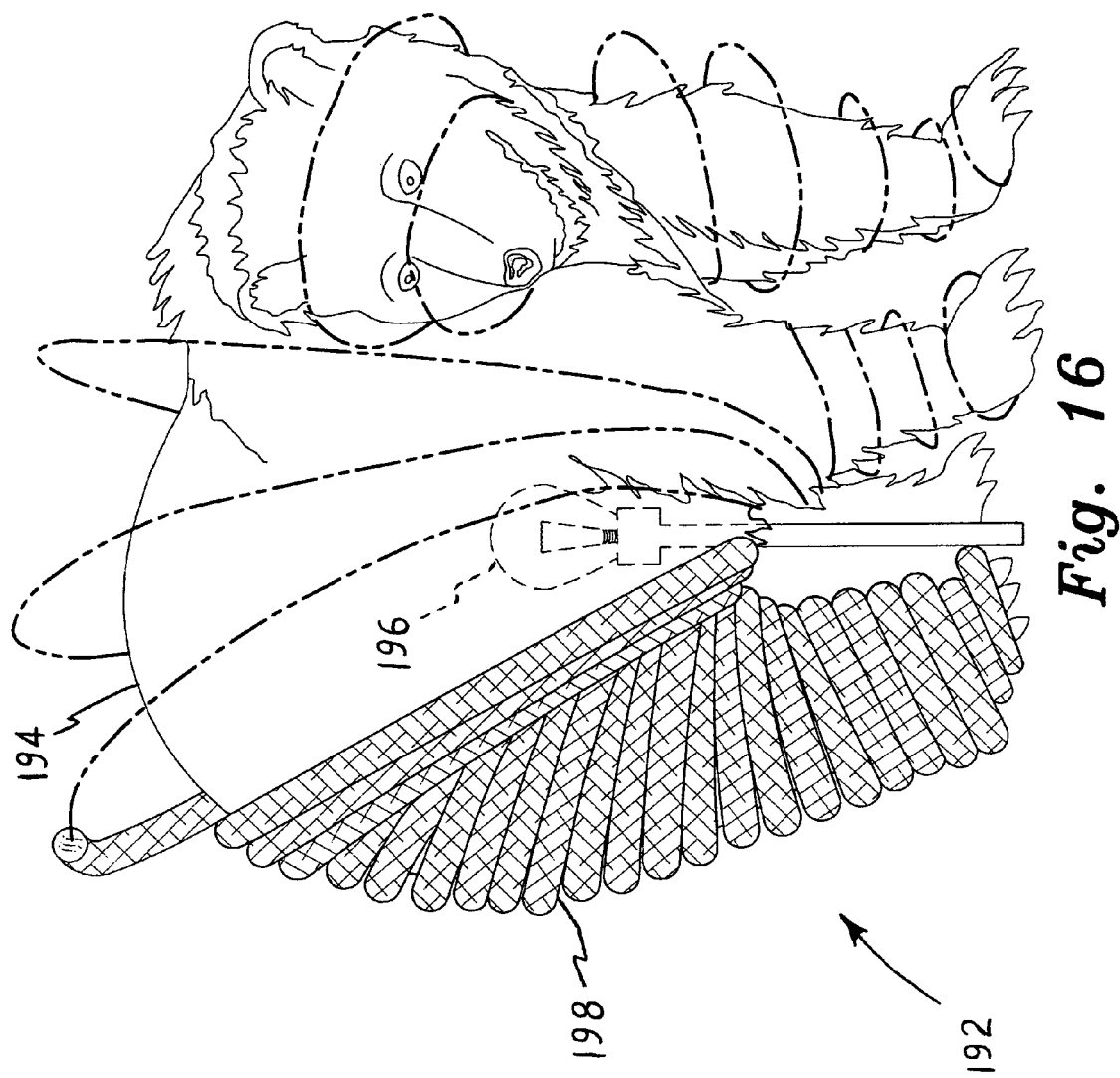
FIG. 16 is an elevation view of a three-dimensional structure in accordance with another embodiment of the present invention, comprising a hollow, internally lighted three-dimensional translucent shell wrapped with translucent rope, with the wrap shown partially completed.

A final embodiment 192 comprising a freestanding translucent three-dimensional sculpture covered with translucent rope material, is illustrated in FIG. 16 of the drawings. In FIG. 16, a translucent, hollow, three-dimensional shell 194 has at least one light 196 installed therein, to illuminate the translucent sculpture from within. (While only a single incandescent light on a vertical support is illustrated in FIG. 15, it will be understood that additional lights of any practicable principle of operation may be installed within the shell 194, to provide even illumination throughout the shell 194 as required.) The core comprising the three-dimensional sculpture shell 194 is then wrapped or enclosed in a cover of translucent stranded fiber material, e.g., a solid core twisted rope 198, etc., to diffuse the light output therefrom and provide an attractive, uniformly lighted object.

In conclusion, the present illuminated rope invention, with its numerous embodiments, provides a series of most attractive illuminated displays. The use of fiberoptic strands, cables, and the like having a translucent rope covering, provides a much improved means of delineating areas at night, such as boat decks and rigging, fences, cables and lines which would otherwise be difficult to see in the dark, etc. Additional brightness may be achieved by dyeing or otherwise treating the rope to provide the desired color(s) as desired, and/or treating the rope to have fluorescent characteristics. The ability of certain embodiments to be shaped or formed as desired to form words, phrases, patterns, etc., provides an economical means of forming advertising and display signs having the same general appearance and performance as conventional neon signs, but allowing the user to reform the signs or messages from time to time as desired. The various control modules disclosed herein allow the brightness and/or color of the lighting to be adjusted or changed as desired as well, thereby providing even greater versatility.

The present illuminated rope may be used to form rigid structures as well as flexible structures, as evidenced by the rigid stairway handrail and standing lamp examples described herein. Such rigid structures may be expanded to form three-dimensional sculptures and other structures, if so desired. The same lighting intensity and color controls may be applied to the three-dimensional and/or other rigid structural embodiments, as well. Any of the embodiments thus disclosed herein, will be seen to provide most attractive and economical illuminated displays, with the various display possibilities being limited only by the imagination of the user.

It is to be understood that the present invention is not limited to the embodiments described above, but encompasses any and all embodiments within the scope of the following claims.

We claim:

1. An illuminated rope comprising:
   at least one translucent fiber optic core;
   at least one light source selectively emitting light through said at least one translucent fiber optic core;
   said at least one translucent fiber optic core emitting the light received from said at least one light source radially therefrom; and
   at least one externally disposed elongate component of translucent rope surrounding and enclosing said at least one translucent fiber optic core, diffusing light emitted therefrom and having a continuously and uniformly lighted appearance when said at least one light source is activated
   said translucent fiber optic core comprises at least one elongate strand of fiber optic material having a first end and a second end opposite said first end; and
   said at least one strand of fiber optic material is selected from the group consisting of flexible and rigid strands of fiber optic material; and
   said at least one light source is disposed at a corresponding said end of said at least one translucent fiber optic core.

2. The illuminated rope according to claim 1, wherein said translucent rope is a stranded fiber selected from the group consisting of a braided rope having a hollow core with said translucent fiber optic core disposed within said hollow core of said braided rope, and solid twisted rope spirally wrapped about said translucent fiber optic core.

3. The illuminated rope according to claim 2, further including at least one pattern woven into said braided rope.

4. The illuminated rope according to claim 1, wherein:
   said at least one translucent fiber optic core has a solid acrylic core.

5. The illuminated rope according to claim 1, further including:
   at least one portable modular adapter for removably connecting at least one said end of said translucent fiber optic core thereto, said portable modular adapter having components selected from the group consisting of a light source for said translucent fiber optic core, an electrical power unit for said light source, and a color illumination adjustment device for adjusting the illumination color of said translucent fiber optic core.

6. The illuminated rope according to claim 5, wherein:
said portable modular adapter further includes at least one receptacle selected from the group consisting of bayonet, pin and socket, and plug and socket connection receptacles; and
each said end of said translucent fiber optic core further includes a fitting compatible with and designed to mate with said at least one receptacle of said portable modular adapter.

7. The illuminated rope according to claim 4, further including:
a wall outlet plate having a configuration for removably receiving at least one said end of said translucent fiber optic core; and
a light disposed within said wall outlet plate, for selectively illuminating said at least one end of said translucent fiber optic core when installed therein.

8. The illuminated rope according to claim 7, wherein:
said wall outlet plate further includes at least one connection receptacle selected from the group consisting of bayonet, pin and socket, and plug and socket connection receptacles; and
each said end of said translucent fiber optic core further includes a fitting compatible with said connection receptacle of said wall outlet plate.

9. The illuminated rope according to claim 4, further including an elongate bending element disposed within said translucent stranded fiber component enclosing said translucent fiber optic core, for selectively bending and setting to hold said translucent fiber optic core and said translucent stranded fiber component to form a pattern as desired.

10. The illuminated rope according to claim 1, further including at least one connector for removably connecting at least a first end and a second end of at least one said translucent fiber optic core to a second translucent fiber optic core.

11. The illuminated rope according to claim 10, wherein:
said at least one connector further includes a plurality of translucent fiber optic core end receptacles therein;
said translucent fiber optic core end receptacles of said at least one connector are selected from the group consisting of bayonet, pin and socket, and plug and socket connection receptacles; and
each said end of said at least one translucent fiber optic core further includes a fitting compatible with said translucent fiber optic core end receptacles of said at least one connector.

12. The illuminated rope according to claim 1, further including a translucent tubular overlay disposed externally about and surrounding said translucent rope.

13. The illuminated rope according to claim 12, wherein said translucent fiber optic core comprises a hollow, three-dimensional sculpture.

14. The illuminated rope according to claim 1, further including:
a support structure, said at least one light source being installed about said support structure; and
wherein said translucent fiber optic core comprises a plurality of translucent shell portions installed about and substantially surrounding said light source and said support structure; and
wherein said translucent rope is installed upon and surrounds said translucent fiber optic core.

15. The illuminated rope according to claim 1, wherein:
said translucent fiber optic core comprises a freestanding, hollow, three-dimensional sculpture;
said light source comprises at least one light installed within said sculpture; and
said translucent rope is installed upon and surrounds said translucent fiber optic core.

16. An illuminated rope comprising:
at least one translucent fiber optic core;
at least one light source selectively emitting light through said at least one translucent fiber optic core;
said at least one translucent fiber optic core emitting the light received from said at least one light source radially therefrom; and
at least one externally disposed elongate component of translucent rope surrounding and enclosing said at least one translucent fiber optic core, diffusing light emitted therefrom and having a lighted appearance when said at least one light source is activated
said translucent fiber optic core comprises at least one elongate strand of fiber optic material having a first end and a second end opposite said first end; and
said at least one strand of fiber optic material is selected from the group consisting of flexible and rigid strands of fiber optic material; and
said at least one translucent fiber optic core comprises a hollow tube; and
said at least one light source comprises a plurality of spaced apart lights disposed internally within said hollow tube.

17. An illuminated rope and connector therefor, comprising in combination:
at least one elongate fiber optic strand having a first end and a second end opposite said first end;
a translucent stranded fiber consisting of rope, cord or twine constructed of a material other than fiber optic;
at least one light source selectively emitting light through said at least one fiber optic strand;
said at least one fiber optic strand emitting the light received from said at least one light source radially therefrom;
said translucent stranded fiber surrounding and enclosing said at least one fiber optic strand, diffusing light emitted therefrom and having a continuously and evenly lighted appearance when said at least one light source is activated;
a connector body having at least two illuminated rope end connector sockets, said sockets communicating with one another and forming at least one light passage through said connector body; and
wherein each said end of said at least one fiber optic strand is configured for connecting with a corresponding one of said connector sockets of said connector body.

18. The illuminated rope according to claim 17, further comprising:
a connector for connecting an end of said illuminated rope with a second illuminated rope, comprising:
an illuminated rope connector body having at least two illuminated rope end connector sockets therein, wherein said connector sockets communicate with one another and form at least one light passage through said connector body.

19. The illuminated rope connector according to claim 18, wherein:
said at least two connector sockets are selected from the group consisting of two, three, and four sockets; and
said connector sockets include illuminated rope end fittings selected from the group consisting of bayonet, pin and socket, and plug and socket end fittings.

* * * * *